United States Patent [19]

Bechtel

[11] Patent Number: 5,204,778
[45] Date of Patent: Apr. 20, 1993

[54] CONTROL SYSTEM FOR AUTOMATIC REARVIEW MIRRORS

[75] Inventor: Jon H. Bechtel, Holland, Mich.
[73] Assignee: Gentex Corporation, Zeeland, Mich.
[21] Appl. No.: 863,442
[22] Filed: Apr. 6, 1992
[51] Int. Cl.$^5$ .................................................. G02B 5/08
[52] U.S. Cl. ...................................... 359/604; 359/601; 250/206; 250/214 B
[58] Field of Search ............... 359/601, 602, 603, 604, 359/605, 606, 607, 609, 613; 250/206, 214 B

[56] References Cited

U.S. PATENT DOCUMENTS

| | | | |
|---|---|---|---|
| 4,443,057 | 4/1984 | Bauer et al. | 359/606 |
| 4,580,875 | 4/1986 | Bechtel et al. | 359/606 |
| 4,793,690 | 12/1988 | Gahan et al. | 359/604 |
| 4,799,768 | 1/1989 | Gahan | 359/604 |
| 4,886,960 | 12/1989 | Molyneux et al. | 250/206 |
| 4,896,030 | 1/1990 | Miyaji | 250/206 |
| 4,902,108 | 2/1990 | Byker | 359/839 |
| 4,917,477 | 4/1990 | Bechtel et al. | 359/603 |

*Primary Examiner*—Loha Ben
*Attorney, Agent, or Firm*—Malcolm R. McKinnon

[57] ABSTRACT

An improved electronic control system for controlling the reflective state of automatic rearview mirrors for automative vehicles, the system including an electrochromic variable reflectance mirror element the reflectivity of which varies over a reflectance range as a function of electrical signal levels applied thereto. The system also includes a first sensing means effective to sense the ambient light level and produce a first electrical signal which is at least in part logarithmically related to the sensed ambient light level. A second sensing means is also provided which is effective to sense the glare causing light level and produce a second electrical signal which is at least in part logarithmically related to the sensed glare causing light level. Means is provided in the control system for combining the signals derived from the first and second electrical signals to produce a third electrical signal which is at least in part indicative of the severity of the glare, and the system also includes improved means which in response to the third electrical signal controls the reflective state of the electrochromic mirror element.

46 Claims, 10 Drawing Sheets

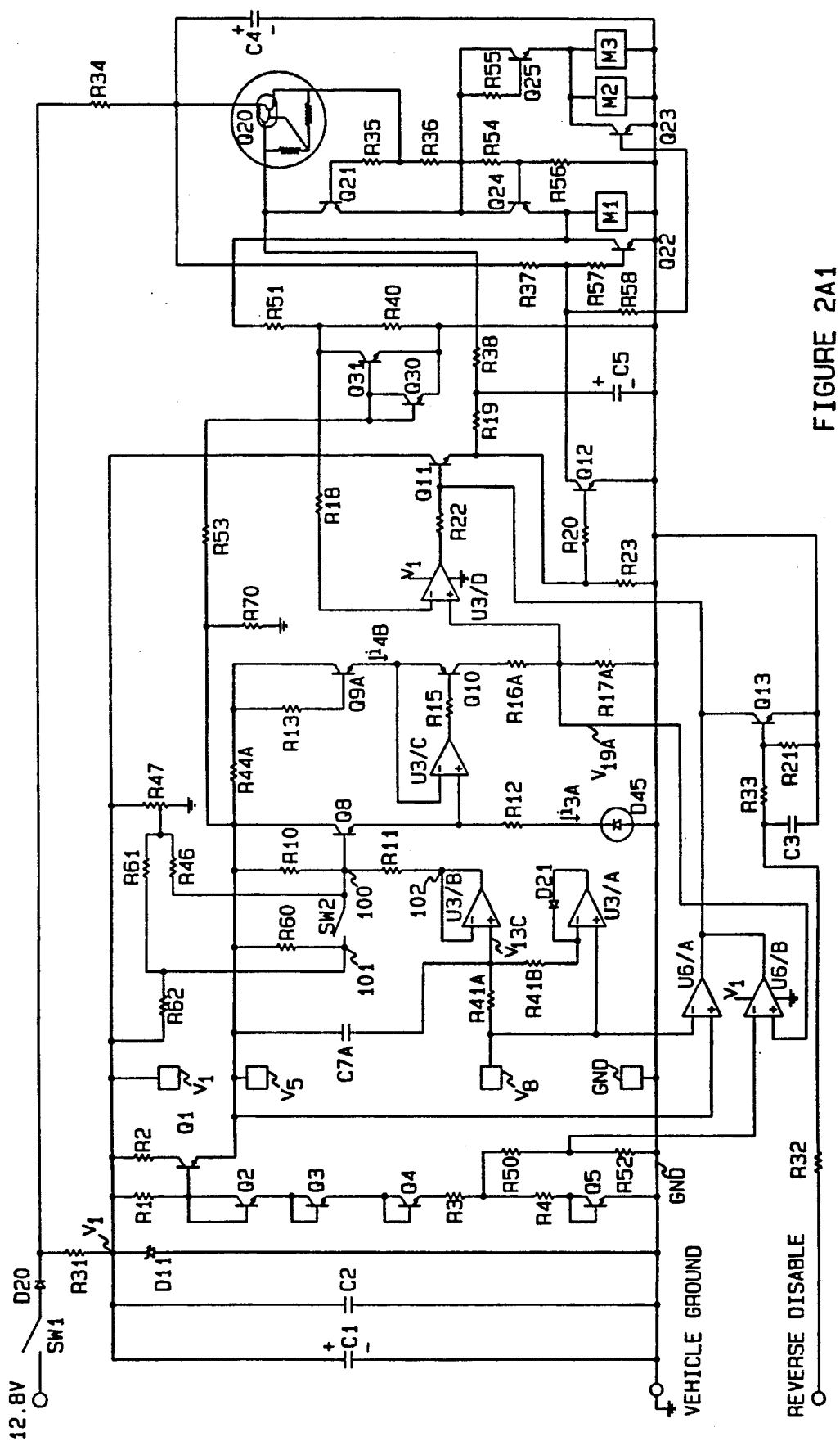
FIGURE 2A1

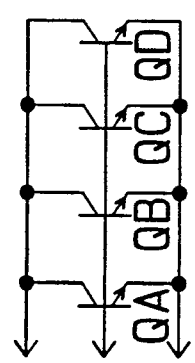
FIGURE 2B
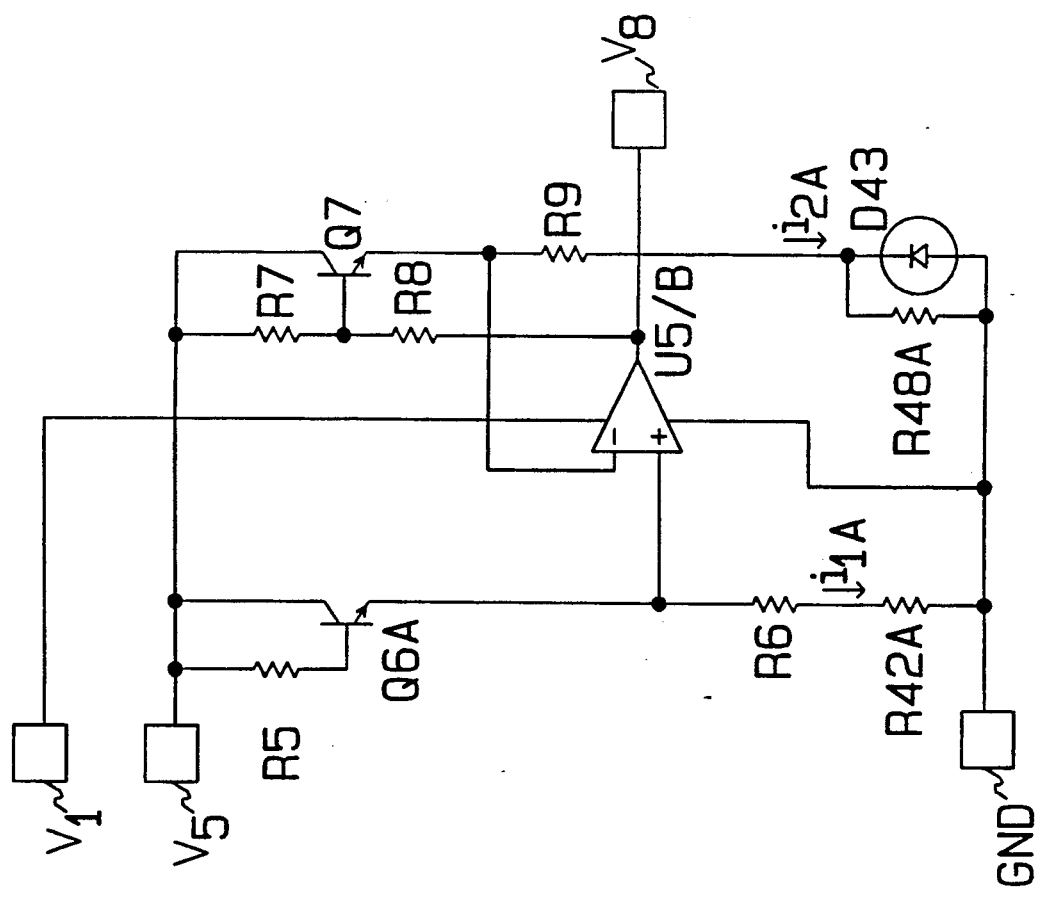
FIGURE 2A2

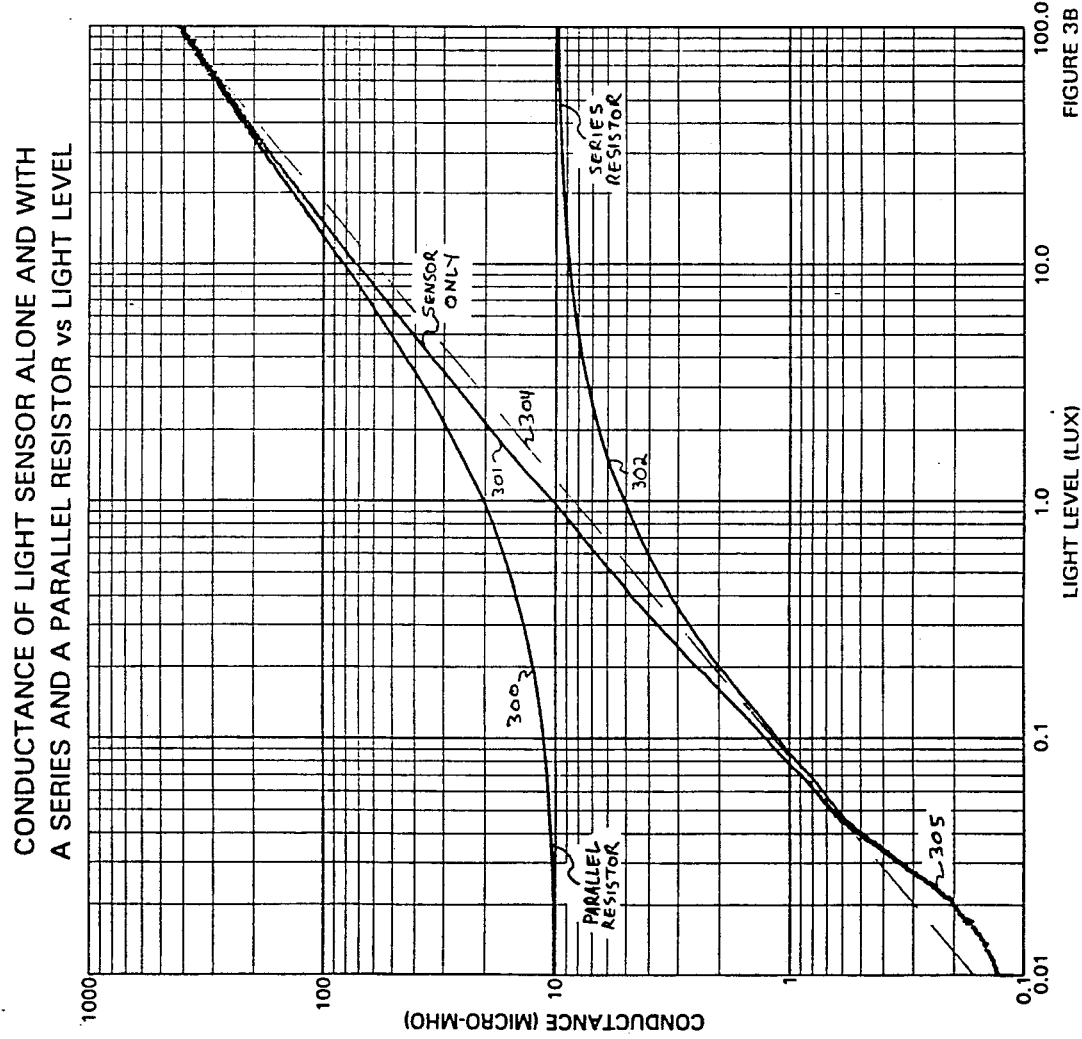

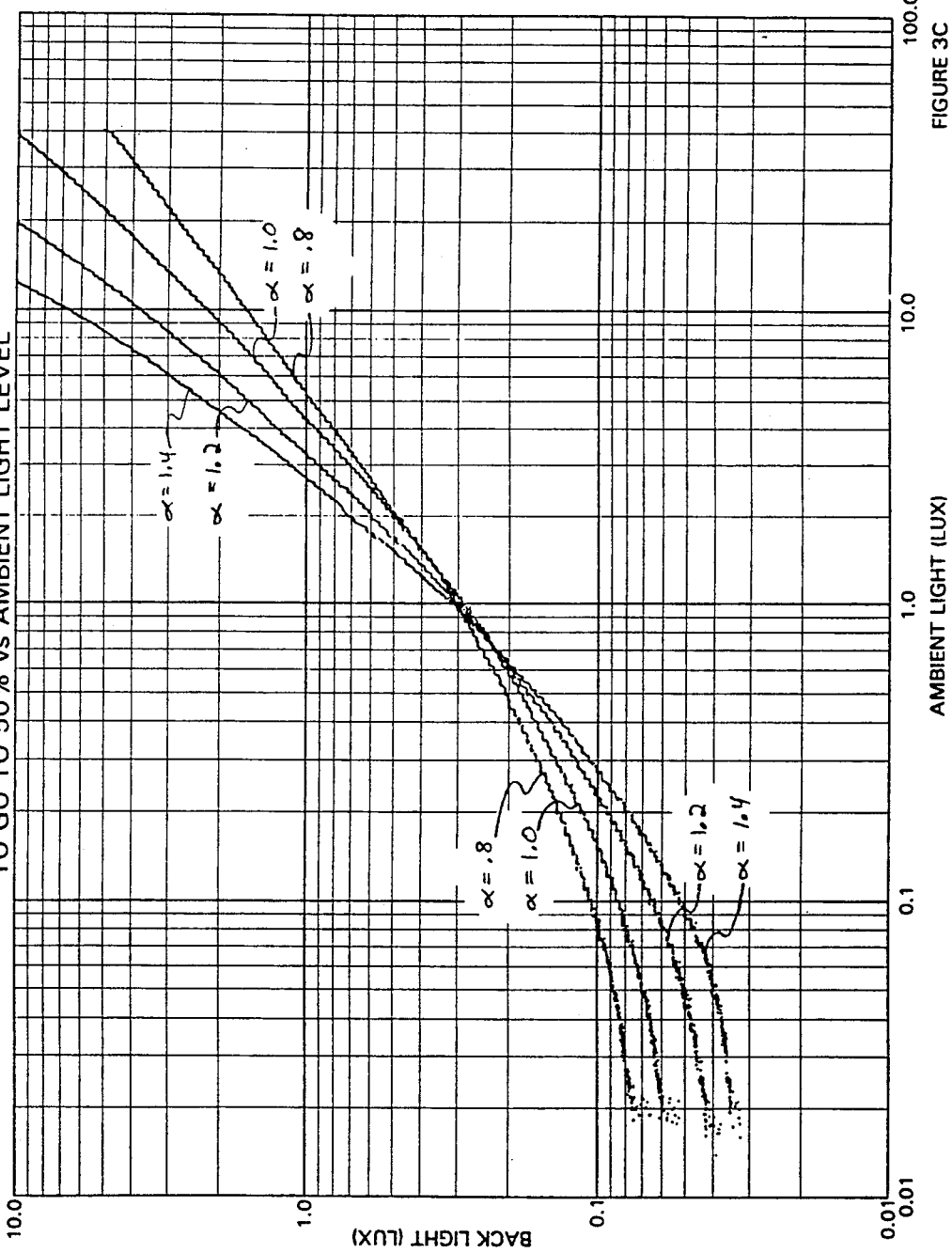

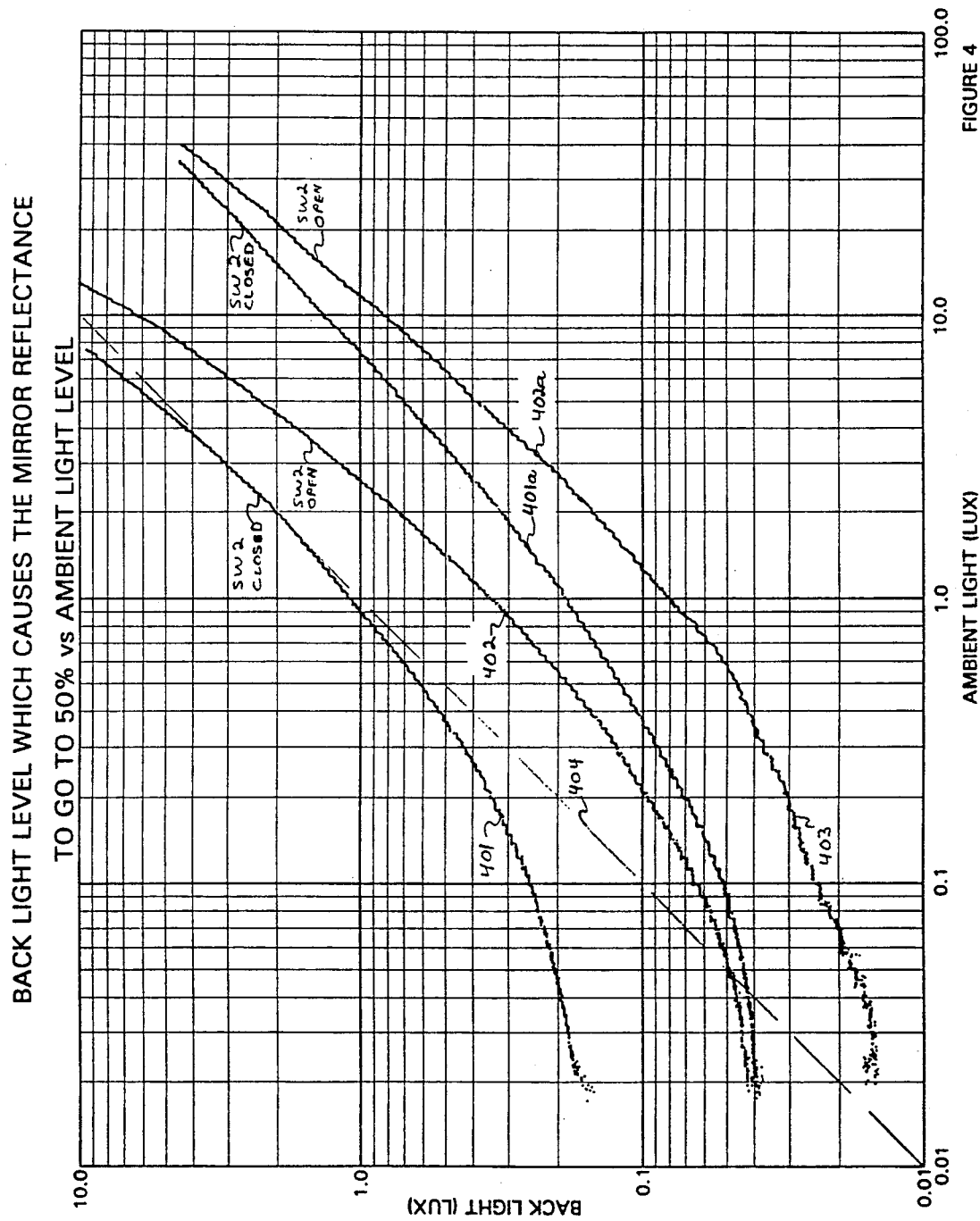

CONTROL SYSTEM FOR AUTOMATIC REARVIEW MIRRORS

BRIEF SUMMARY OF THE INVENTION

The invention relates to automotive rearview mirrors and, more particularly, to automotive rearview mirrors which incorporate control circuitry designed to control automatically a variable reflectance mirror element, such as an electrochromic mirror element, over a continuous reflectance range.

Solution phase electrochromic mirror elements similar to those described in U.S. Pat. No. 4,902,108, issued Feb. 20, 1990 to Dr. Harlan Byker and assigned to the assignee of the present invention, are used in preferred embodiments of the present invention but it will be understood that the control circuits are not limited in application to such devices.

Heretofore, one particularly difficult aspect of mirror control has been to characterize properly the glare threshold as a function of the indicated ambient reference level. The glare sensor is normally directed rearwardly to measure the level of light which strikes the mirror and which is a potential source of glare. This light level is sometimes referred to as the glare causing light level, but will for simplicity normally be referred to as the rearward light level. The glare threshold is the level of this signal or of the rearward light level which the control circuit determines as the onset of glare and normally responds by effecting some level of dimming of the mirror element. Circuits which factor in an ambient light condition to determine glare must make some measurement to determine this condition. The result of this measurement will generally be referred to as the ambient light level or signal. This measurement has generally been made using a sensor which normally faces forward but many variations are possible. For example, some have factored in a signal from a rear sensor with a signal from the front to establish the ambient light level. The ambient light signal is in some cases used directly; but, in many others, the ambient light signal undergoes further processing before arriving at the signal which is actually used as a reference in the determination of the glare level. This final processed signal is generally referred to as the ambient reference level. Prior art devices have used various algorithms to obtain an ambient reference level. These include direct use of the instantaneously measured ambient light level as the ambient reference level, use of various types of averages of the ambient light level as the ambient reference level, and use of various other alterations of the signal from the ambient light sensor to derive an ambient reference level. Some of the techniques for establishing the ambient reference level are much better than others. However, in the present case, the focus is more on the functional relationship between the glare threshold for light from the rear and the ambient reference level than on the algorithm for establishing the ambient reference level. Thus, assume that the ambient reference level may be generated in whole or in part by any of a number of these algorithms unless it is stated otherwise. U.S. Pat. No. 3,601,614 to Platzer, U.S. Pat. No. 4,443,057 to Bauer et al., U.S. Pat. No. 4,917,477 to Bechtel et al., U.S. Pat. No. 4,580,875 to Bechtel et al., U.S. Pat. No. 4,793,690 to Gahan et al., and U.S. Pat. No. 4,886,960 to Molyneux et al., each deal with one or more methods to establish an ambient reference level and with various aspects of the problem of relating the glare threshold to the ambient reference level.

The above mentioned patents indicate that heretofore one of the most persistent problems has been to prevent over dimming of the mirror in high ambient light conditions while not preventing the mirror from dimming fully or at all under other high ambient light conditions for which dimming is still needed. The circuits in various embodiments in the above patents generally incorporate the front and back sensors in a bridge or partial bridge configuration. The use of a bridge configuration tends to establish the functional relationship between the glare threshold (sensitivity) and the ambient reference level as one of direct proportionality. For example, with a proportional functional relationship, doubling of the ambient reference level will approximately double the glare threshold for a significant portion of the operating range of the circuit. In both U.S. Pat. Nos. 4,443,057 and 4,917,477 it is shown that it was desirable under some conditions to more than double the glare threshold when the ambient reference level doubled. However, conditions and preferences are diverse so that under other conditions or for other user preferences, it may be desirable to only double or less than double the glare threshold when the ambient reference level is doubled. A diode shaping network was used in the rearward circuit of U.S. Pat. No. 4,443,057 to desensitize the mirror to a greater extent under the combined conditions of a low sensitivity setting and a high ambient light level than did the comparable circuit without the shaping network. Many production mirrors were made without this diode shaping network because its desensitizing effect varied from too little to too much over a relatively small range in ambient reference level. Furthermore, its effect was highly dependent on the sensitivity setting and there was little latitude to characterize its effect as a function of the sensitivity setting. Similarly, an optional feature of one of the embodiments of U.S. Pat. No. 4,917,477 used a diode to cause a further decrease in the sensitivity of the mirror in going from an intermediate to a full dark reflectance level in higher ambient light conditions. Many production mirrors were also made without this feature because of complaints generated because it completely prevented the mirror from going to its minimum reflectance state when the ambient reference level was high. People thought that the mirror was not working properly. Prior art devices, the most notable of which are described in the patents listed above, also employed series resistors, parallel resistors and varying source resistances including a current source (which behaves as an infinite source resistance) to shape the rearward glare threshold versus the ambient reference level characteristics. These methods met with considerable success for some applications, but as will be illustrated hereinafter, the effects of series and parallel resistors each tend to be dominant over one part of the light level range and insignificant over another. Furthermore, varying applications, varying user preferences, and varying degrees of emphasis on safety versus comfort require different characterizations of the glare threshold versus the ambient reference level.

A specific example which illustrates the need to characterize the glare threshold versus the ambient reference level is a situation in which a very sensitive setting was required for highway driving conditions for which the ambient reference level was low. A mirror using the sensor configuration which is similar to that of the multiple state embodiment of the U.S. Pat. No. 4,917,477 patent was tried. It was possible to adjust the circuit to provide very high sensitivity for low ambient light conditions. The problem was that at dusk or at dawn the mirror remained so sensitive that it responded to the panorama of light coming from the sky and would dim undesirably with no other automobiles or even the sun or a particularly bright part of the sky in view in the rearview mirror. A serious attempt was made to implement a reasonably simple modification to the circuit to re-characterize the glare threshold as a function of the ambient reference level in a way that maintained the high sensitivity for low ambient reference levels but which did not cause the mirror to dim in unsafe and annoying ways at dawn and at dusk. The results were disappointing yielding only marginal improvement.

A co-pending application Ser. No. 07/670,258, filed Mar. 15, 1991 for Electronic Control System and assigned to the assignee of the present invention utilizes a microcomputer in combination with some analog circuits to obtain digital values for the logarithms of the light sensor resistances. The microcomputer uses a digital filtering algorithm to obtain a logarithmically weighted time average of the forward light level in digital form. The microcomputer then performs further digital processing on the signals to derive the control output. There are similarities in the control algorithms of the microcomputer based device and the present invention but also notable shortcomings and differences in the digital control algorithm. Scaling of logarithmic values to obtain the valuable advantages in the characterization of the functional relationship between the glare threshold and the ambient reference level was not done because the desirable effect of doing so was not recognized. Had the above method of characterization been recognized, its implementation would still have required an additional multiply operation in the microcomputer which did not have a multiply instruction. It is possible to program the multiply function but this requires memory space and execution time both of which are limited in the lower cost microcomputers. The device of the co-pending application performed the logarithmic conversions in the digital processing mode and the logarithmic values were then available only in digital form. The most economical control solutions for some applications will require a mix of analog and digital processing. When the logarithmic values are derived in digital form, a digital to analog conversion must be performed to make them available in analog form. This is relatively expensive and limits the trades which might otherwise be made between digital and analog processing steps.

There are numerous other limitations to the disclosed microcomputer controlled mirror which are overcome in the present analog based design of the preferred embodiment. The digital based circuit of the co-pending application is normally economical only when the value of added functions such as an interface to switches, or to a windshield wiper control, or to a headlamp on/off control justify the cost of the microcomputer and its associated clock and memory. For stand alone applications and even for a more self contained mirror control subsystem of a larger electronic package, the analog based mirror control of the present invention has clear economic advantages over the co-pending digital based control unit. As one example, the digital filter which performs the time averaging is one of the major blocks in the microcomputer controller algorithm for the mirror. The time averaging function is achieved much more economically with a resistor and capacitor in the device of this invention.

This inventor of the present invention is not aware of any application of logarithmic conversions to signals used in controlling rearview mirrors except for those used in the co-pending application referenced above. There is, however, a significant body of art which pertains to the use of the logarithmic relationship between the base to emitter voltage of a bipolar transistor and either the emitter current or the collector current of the transistor. Log Converters, National Semiconductor Application Note 30, Robert C. Dobkin, November 1969, is an article which deals with the use of bipolar transistors for logarithmic conversions. A more extensive treatment is found in *Nonlinear Circuits Handbook*, Second Edition January, 1976, Analog Devices, Inc., Norwood, Mass. Chapter 3-1 is entitled About Logarithmic Circuits; Chapter 4-1 is entitled Log-Circuit Applications; Chapter 4-2 is entitled Log Ratio Applications; Chapter 4-3 is entitled Antilog Applications. The use of the bipolar transistor for log and antilog or exponential conversions is based on the relationship between the base to emitter voltage and either the collector current or the emitter current of the transistor. There are several aspects of this relationship which make it difficult to apply. First the logarithmic term is proportional to absolute temperature which gives it a temperature coefficient of about 0.3 percent per degree Celsius. Secondly, the base to emitter voltage increases by approximately 18 millivolts for a two to one increase in emitter current or only about 270 microvolts for a 1 percent increase in emitter current. The base to emitter voltage is not conveniently scaled relative to zero volt. For example, in the preferred device, the transistor base to emitter voltage caused by a photocell illumination of 10 lux is approximately 0.65 volt. A base to emitter voltage of zero volts then represents a light level of approximately 0.00000000009 lux which is about 8 decades smaller than the smallest light level of interest. Since the logarithmic representation yields a constant increment per decade, this is a very large offset. Furthermore, the value represented by a zero base to emitter voltage has a separate and much larger temperature coefficient than the 0.3 percent per degree Celsius temperature coefficient of the logarithmic value. The effect of this temperature coefficient is best illustrated by an example. An increase of 1 degree Celsius in the temperature of the transistor used to measure the logarithmic value results in a decrease of approximately 1.8 millivolts in the base to emitter voltage which represents the logarithmic value. A decrease of approximately 7 percent in the signal being measured is required to cause the same 1.8 millivolt decrease in the base to emitter voltage. For a temperature change from −25 to 85 Celsius (the usual automotive operating temperature range), the change in the base to emitter voltage is approximately the same as that caused by a 1,600 to 1 decrease in the signal being measured! In the Analog Devices *Nonlinear Circuits Handbook*, chapter 3-1, About Logarithmic Circuits, applications of the bipolar transistor using the base to emitter voltage versus the emitter current and using the base to emitter voltage versus the collector current are both discussed and it is shown that use of the collector current yields superior results. A method to configure a bipolar transistor in the feedback loop of an operational amplifier and to direct the current whose logarithmic value is being measured through the collector of the transistor is shown. Techniques for stabilizing the feedback loop of the amplifier are also discussed. Techniques for using matched transistors to cancel some of the large temperature effects are also discussed.

One might believe that they have only to study a few chapters from the excellent Analog Devices handbook and then copy a few circuits to obtain a log circuit to control the mirror. This is not true. The logarithmic characteristics are inherent with the bipolar transistor and are of interest to circuit designers who do detailed analysis of any bipolar transistor circuit even though most of the time it is not a primary aim to exploit the logarithmic property of the transistors directly for computational purposes. To utilize the bipolar transistor for logarithm based analog computation then is like most circuit design in that the electronic components must be creatively configured to yield the desired result. The difference is that many more details of the transistor physics and many more concerns for minimizing errors with handling the electrical signals and with the adverse effects of temperature have to be dealt with in the logarithmic design than in most other designs. It is probably for this reason that the formal uses of the logarithmic properties of the bipolar transistor have been relegated mostly to relatively high precision, and normally very high cost, high performance, specialty circuits. The computational part of the mirror circuit is certainly not a copy of a "text book" circuit.

One of the claimed features of U.S. Pat. No. 4,886,960 is to use a filter circuit on the signal that is generally related to the ambient light signal and which responds more quickly to increasing light levels than to decreasing light levels. The patent does not explicitly define the way in which the signal which is averaged is related to the forward light level. The embodiments which are shown in U.S. Pat. No. 4,886,960 incorporate a circuit which is generally a bridge circuit and which introduces limited cross modulation between the front and the back signals to derive the ambient light signal which is then filtered. The patent does not specify or suggest a logarithmic functional relationship between the ambient light level and the signal which is input to the filtering means. Furthermore, the bridge circuit of the embodiments which are shown do not yield signals which are logarithmically related to the ambient light level. One of the embodiments of this invention uses a dual time constant filtering approach similar to that used in U.S. Pat. No. 4,886,960 for which the improvement is that the signal which is introduced to the filter is logarithmically related to the ambient light level. Also, special features of various embodiments of the circuit include the generation of analog signals which are logarithmically related to the light levels and their use in the control algorithm.

An object of the present invention is to utilize logarithmic processing to control the slope of the mirror glare threshold versus the ambient reference level over a wide range of forward light levels and to do so in a manner which provides a relatively simple means to adjust this slope characteristic in order to properly optimize the mirror control circuit for various applications, such adjustment being optionally achieved by a choice of component values or by an adjustable element which may optionally be user adjustable.

Another object of the present invention is to provide a mirror control circuit which meets automotive environmental and initial part approval testing requirements and which is suitable for efficient large scale production and for general use to control automatic mirrors in automatic vehicles.

Another object of the present invention is to separate calibration adjustment means from user adjustable means and to make significant changes in both the slope ($\alpha$) and calibration factor ($S_A$) as defined hereinafter as part of the user selectable calibration. Implicit in this objective is the fact that the ($\alpha$) and the ($S_A$) may be specified almost independently over rather wide ranges.

Another object of the present invention is to convert the signals from the sensors to a form which is substantially logarithmic before performing any processing steps which introduce current or voltage gains of the log transistor into the feedback loop of an amplifier other than the one based on the gain of the log transistor itself.

Another object of the present invention is to provide an improved control system for automatic rearview mirrors in which a substantial portion of the circuitry can be economically integrated into one or more monolithic integrated circuits.

Another object of the present invention is to obtain at least one logarithmically weighted time average of a signal related to the forward light level using a network containing a resistor and capacitor to provide the averaging function.

Another object of the present invention is to partition the circuitry into at least two sub-circuits, a first of these sub-circuits being closely associated with an ambient light sensor and a second of the sub-circuits being closely associated with a rear light sensor, the first and second sub-circuits processing the signals from their respective sensors prior to routing the signals into portions of the circuits array which have less environmental protection from effects such as moisture induced leakage or capacitively, magnetically, or electromagnetically induced interference. [It is intended that the first and second sub-circuits should not be identical and that at least one should contain features which are specific to the mirror control function.]

Another object of the present invention is to utilize analog logarithmic processing techniques which are largely the niche of high cost, high accuracy analog processing circuitry and to make prudent trades in circuit design and circuit design requirements in order to utilize these techniques in the cost sensitive automotive market.

Another object of the present invention is to modify the exponential stage to partially characterize the relationship between the reduction in the mirror reflectance and the severity of the glare.

Another object of the present invention is to perform additional signal conditioning after the exponential conversion to partially characterize the relationship between the reduction in the mirror reflectance and the severity of the glare.

Another object of the present invention is to provide a mirror element drive circuit which economically provides different drive levels to two or more mirror elements while deriving the drive levels from a common control signal and while sharing common circuit protection mechanisms for the mirror element supplies.

Another object of the present invention is to perform a complete mirror control function using signals which are logarithmic in nature in a circuit which is primarily analog i.e. which does not directly -utilize a programmed digital computing device in the mirror control loop.

Another object of the present invention is to use a shorter time constant for increasing than for decreasing light levels and wherein the signal input to the averaging block is at least in part related to the logarithm of the signal from the ambient light sensing means.

Another object of the present invention is to utilize the flexibility of the control circuit in the prescription of the values particularly of the slope characteristic ($\alpha$) and also of the sensitivity ($S_A$) to offset or compensate for the non-ideal or the actual performance of the light sensors which are used.

The above as well as other objects and advantages of the present invention will become apparent from the following description, the appended claims and the accompanying drawings.

BRIEF DESCRIPTION OF THE DRAWINGS

FIGS. 2A1 and 2A2 are schematic circuit diagrams of an embodiment of the invention which uses photodiodes and which includes a circuit to supply different voltages to different groups of mirror elements. FIG. 2A2 includes the portion of the circuit which has been partitioned for close association with the ambient light sensor and FIG. 2A1 includes the portion of the circuit which has been partitioned for close association with the rear or more generally the glare causing light sensor.

FIG. 2B is a schematic circuit diagram of the quad parallel transistors used for transistors Q6A and Q9A of FIGS. 2A1 and 2A2.

FIG. 3B illustrates plots of conductance of a light sensor alone and of a light sensor with a parallel and of a light sensor with a series resistor versus the light level.

FIG. 3C illustrates plots of the back light level which causes the mirror reflectance to go to 50 percent versus the ambient light level using various values for the exponent $\alpha$.

FIG. 4 illustrates plots of the back light level which causes the mirror reflectance to go to 50 percent versus the ambient light level for the user selectable high sensitivity and low sensitivity settings of the control circuit, the plots being repeated for two different calibration settings of the mirror control.

FIG. 5B includes the portion of the circuit which has been partitioned for close association with the ambient light sensor and FIG. 5A includes the portion of the circuit which has been partitioned for close association with the rear or more generally the glare causing light sensor.

DETAILED DESCRIPTION

Figure 1:
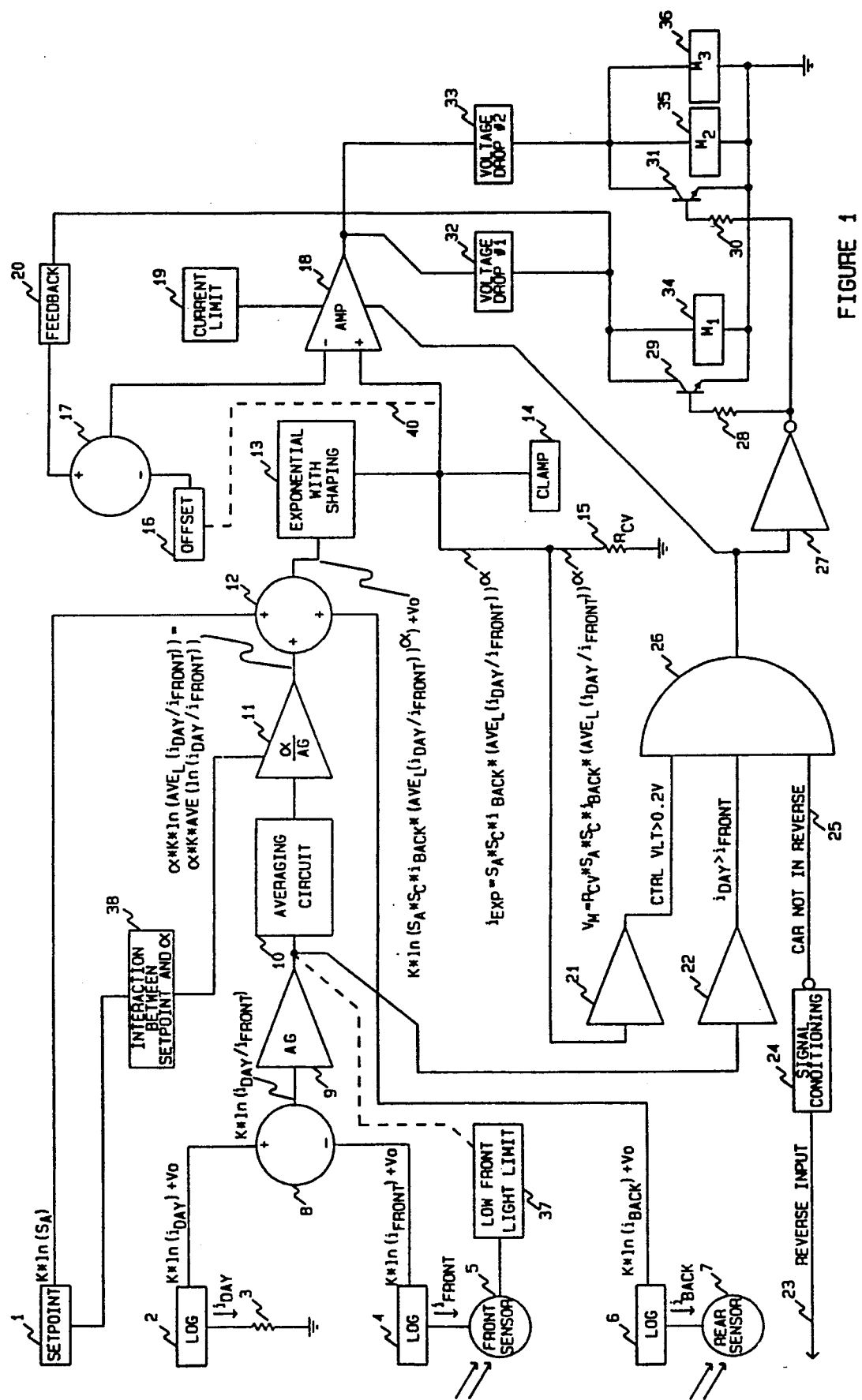
FIG. 1 is a block diagram of an improved control system for automatic rearview mirrors and illustrates several embodiments of the invention.

As previously explained, heretofore an attempt was made to provide a mirror which was very sensitive when the ambient reference level was low. Also, as noted this led to unsafe and annoying dimming at dawn and at dusk. The first step toward a reasonable solution to the problem was to recognize that, if a mirror could be made very sensitive at low ambient reference levels and if this sensitivity could be gradually decreased to levels known not to give problems in the high ambient reference levels experienced at dawn and at dusk, such a mirror might solve the problems. After this discovery, an attempt was made to characterize the functional relationship between the glare threshold and the ambient reference level of one of the best of the prior art circuits to meet the criteria stated above. This was the intent of the modifications which were tried on the existing mirror circuit and as noted the results were disappointing. This failure underscored the need to have a mirror control for which adjustment of the functional relationship between the glare threshold and the ambient refernce level could be made in a really flexible way. It also underscored the lack of flexibility of the existing designs to handle this problem and further investigation also revealed that because of this inflexibility, control performance and safety were also being compromised in subtle ways in many mirror applications. Having the mirror dim in daylight or when no source of glare is apparent may be the only instances of over dimming of which the driver of an automotive vehicle is aware and many other instances of over dimming may go unnoticed.

In most other situations, a driver of a vehicle is very aware of annoying glare but much less able to judge when his or her safety is compromised because glare could have been relieved with less dimming allowing better visibility. A mirror control should provide maximum visibility by dimming enough to adequately remove glare while not over dimming. Furthermore, these two requirements are in partial conflict since the best visibility normally occurs at a light level which is not yet blinding or disabling but which may cause the viewer considerable discomfort. Some users may opt for more comfort at the expense of their optimal ability to see. Thus, the driver or at least the manufacturer who provides the mirror should have the ability to chose the criteria and to reasonably optimize the mirror control to meet the criteria. Public safety should not be comprised because a control which lacks flexibility to be adjusted to dim only when needed is instead adjusted to dim much more than is needed. The design rule "if in doubt, dim" removes discomfort and, thus, nearly all complaints but at the expense of safety. The effect of the adjustable exponent introduced in this invention by scaling one of the logarithmic values relative to another provides a way to alter the functional characteristic between the glare level and the ambient reference level in a way which is uniform over a wide range of operation. Furthermore, the slope can be adjusted to any desired value by adjusting the scaling factor. Thus, for the application described above where very high sensitivity was needed under low ambient light conditions, the circuit of the invention was adjusted by simply changing the value of one resistor so that an increase of 10 percent in the ambient reference level increases the glare threshold by approximately 14 percent over a substantial portion of the ambient reference level range. An exponent of approximately 1.4 was used to achieve this result as will be explained in more detail hereinafter. The settings above resulted in a mirror which possessed the desired high sensitivity when the ambient reference level was low but which made a gradual trouble free transition to a manageable sensitivity under driving conditions encountered at dawn and at dusk. By lessening the degree of dimming under conditions where the high sensitivity was not demanded, the driver's safety was enhanced at the same time that his or her annoyance from unwanted dimming was properly controlled. The exponent of 1.4 chosen for the above application is not optimal for many other applications. With the present invention an optimal value can be sought and implemented once it is obtained. Summarizing, known prior art mirrors lacked the flexibility to adjust the slope of the functional response characteristic between the glare level and the ambient reference level uniformly over a large part of the operating range. Optimal safety has normally been sacrificed in the compromise which results from this inflexibility.

The analog circuit of a preferred embodiment of this invention possesses many advantages over the digital circuit of the co-pending application. In the analog circuit, a resistor, a capacitor, and one buffer amplifier perform the averaging function. In the co-pending application, the digitally based time averaging function is a substantial portion of the mirror related microcomputer software. In the microcomputer based design of the co-pending application, almost as much analog circuitry is required to implement conversion of the signals from the light sensors and the other inputs such as the switches and the backup light sensor to digital form and then to convert the microcomputer output signal to a mirror element drive level as is required to implement the complete analog embodiment of the control circuit of the present invention. The analog circuit embodiment of this invention is very inexpensive when compared against the cost of the microcomputer and its associated components.

An objective of the co-pending application to minimize the processing steps required to convert the signals to logarithmic form is a good one and is met even more directly in the analog version of the preferred embodiment of this invention. In several embodiments of this invention, current for each sensor is supplied directly from the emitter of a bipolar transistor whose logarithmically related base to emitter voltage is used to perform the logarithmic conversion. The associated operational amplifiers play no direct role in the logarithmic conversions. Instead they perform level shifting functions for the transistor base voltages in order to take the required computational sums and differences to provide the signal to the final exponential stage which in turn establishes the drive voltage for the mirror element when dimming is required.

Many problems were faced in the design of the logarithmically based circuit which looks deceptively simple. As noted above, changes in the signals which represent the logarithmic values due to extremes of the automotive temperature range are equivalent to changes of approximately 1,600 to 1 in the measured values. In the best log transistor configuration, the log transistor is used in a common base configuration and is placed in the feedback path of an operational amplifier so that its voltage gain is introduced into the feedback path causing complicated frequency compensation problems. When these problems are not correctly solved, oscillations occur and these oscillations can cause malfunction or even failure of the mirror. It was also not apparent at the outset that the analog based logarithmic circuit would provide such a flexible and useful adjustment means to characterize the functional relationship between the glare level and the reference level. The ability to characterize the functional relationship between the glare level and the ambient reference level and its usefulness was discovered partly as the result of an investigation of the effect of a failure to restore the unity gain level to the signal after the time averaging step and partly as a result of an application problem which underscored the need for the flexibility afforded by the feature.

In summary, to make the circuit practical, temperature compensation was introduced; voltage levels were increased for the time averaging circuit in which capacitor leakage currents and amplifier input bias currents create voltage offsets which would otherwise cause unacceptably high errors in circuit performance; and in one of the preferred embodiments the more easily stabilized base to emitter voltage versus emitter current mode was used for the log transistors.

MIRROR CONTROL CIRCUIT

Referring to the simplified block diagram of FIG. 1, the circuit uses current to logarithmic conversions in blocks 2, 4 and 6. The light sensors are cadmium sulfide photoresistors in one embodiment and photodiodes in another. In the embodiment which uses the photodiodes, the current in the photodiodes varies in approximate proportion to the light level impinging on them so that the sensor current level is the indicator of the incident light level. In the embodiment with the photoresistors, an approximately constant voltage is maintained across the photoresistor through light level ranges for which dimming of the mirror is normally required and the conductivity of the photoresistors increases in approximate proportion to the light level impinging on them so that again, the sensor current level is indicative of the incident light level. The first current to logarithmic converter in block 2 converts $i_{DAY}$ to a logarithmically related voltage. Here the day detect threshold, $i_{DAY}$, establishes the front light level above which the darkening of the mirror is inhibited. $i_{DAY}$ is controlled by the value of resistor 3 which is chosen to approximately equal the resistance of the photoresistive ambient light sensing means 5 when illuminated to 33 lux. The day detect function is optional and the threshold can be different from the 33 lux chosen here. This establishes a day detect threshold of approximately 33 lux. The second logarithmic converter in block 4 converts $i_{FRONT}$, the front sensor current through photoresistor or photodiode 5 which is approximately proportional to the ambient light level that the driver views through the front windshield of the automobile, to a logarithmically related voltage. The third logarithmic converter in block 6 converts $i_{BACK}$, the back sensor current through photoresistor or photodiode 7 which is approximately proportional to the glare causing light from the back, to a logarithmically related voltage. In the calculations, ln(x) is used to denote the natural logarithm of x and K and $V_0$ are temperature dependent "constants" which match closely for similar transistors which are part of a common integrated circuit.

The three logarithmically related voltages are indicated below:

$$K*ln(i_{DAY})+V_o$$

is the base to emitter voltage signal which is logarithmically related to $i_{DAY}$;

$$K*ln(i_{FRONT})+V_0$$

is the base to emitter voltage signal which is logarithmically related to $i_{FRONT}$; and $$K*ln(i_{BACK})+V_0$$

is the base to emitter voltage signal which is logarithmically related to $i_{BACK}$.

Then since the difference of natural logarithms is equal to the natural logarithm of the quotient, the difference between the signals which are logarithmically related to $i_{DAY}$ and $i_{FRONT}$ is taken at summing point 8 as follows:

$$K*ln(i_{DAY})+V_0-(K*ln(i_{FRONT})+V_0)=K*ln(i_{DAY}/i_{FRONT}).$$

Note that the constants $V_0$ in the two expressions cancel in the subtraction.

Amplifier 9 multiplies the signal by the gain AG which is approximately 11 in the preferred embodiment. The amplified signal is averaged by a time constant or by a more complex circuit in the averaging circuit of block 10. The increased signal levels significantly reduce errors due to voltage shifts caused by the buffer amplifier input bias current and the time averaging capacitor leakage. The averaged result is then buffered and multiplied by the value $\alpha/AG$ in the buffer amplifier and attenuator circuit 11. The multiplication by AG and the attenuation by the gain of $\alpha/AG$ leaves the uncanceled factor $\alpha$ which has the effect of raising the term represented by the signal to the $\alpha$ power after the exponential conversion is performed. The next step is one of semantics. Note that the signal which was averaged is proportional to the natural logarithm of $i_{DAY}/i_{FRONT}$. The averaged signal is still in logarithmic form and can be considered to be the natural logarithm of the logarithmically weighted average of $i_{DAY}/i_{FRONT}$, or expressed as an equation, $$\alpha*K*Ave(\ln(i_{DAY}/i_{FRONT})) = \alpha*K*\ln(AVE_L(i_{DAY}/i_{FRONT}))$$
$$= K*\ln((AVE_L(i_{DAY}/i_{FRONT}))^\alpha)$$

where $Ave_L(x)$ is a functional notation to denote the logarithmically weighted average of x.

The setpoint circuit 1 supplies current to alter the signal voltage by an amount $V_{SP}$ where the setpoint current is chosen so that:

$$V_{SP}=K*ln(S_A)$$

where $S_A$ is the constant which yields the desired calibration for the mirror. $S_C$ is the component of the scaling introduced by circuit parameters such as by mismatches in the transistors used for the logarithmic or the antilog conversions. Some of the circuit parameters which affect the value of $S_C$ are not intentionally introduced and include mismatches caused by normal variations between transistors used for the log functions and non-ideal performance of the operational amplifiers. Other factors which affect the value of the scaling factor $S_C$ are intentionally introduced to minimize the voltage $V_{SP}$ which is required to properly calibrate the circuit. Methods for adjusting $S_C$ include the use of multiple transistors for select log or antilog conversions which will be discussed later. The signals representing the logarithm of the logarithmically weighted average, the logarithm of the setpoint scale factor, and the logarithm of the glare causing signal from the rear are all summed at 12 to yield $$K*ln(S_A*S_C*i_{BACK}*(Ave_L(i_{DAY}/i_{FRONT}))^\alpha)+V_0.$$

This sum is then exponentially converted to yield a signal $$i_{EXP}=S_A*S_C*i_{BACK}*(Ave_L(i_{DAY}/i_{FRONT}))^\alpha$$

Here the constant $V_0$ introduced by the logarithmic conversion of the rear sensor current is cancelled by a similar constant in the exponential conversion and the constant K in the logarithmic conversions is cancelled by a similar constant K in the exponential conversion. Note that the effective cancellation of terms here and in the preceding logarithmic conversions depends on good temperature and physical matching of the four transistors used in the log and the antilog conversions. Because of the cancellation in block 8 of the $V_0$ terms from blocks 2 and 4 and the cancellation of the $V_0$ term from the block 6 in the exponential conversion of block 13, it is more important to match block 2 with block 4 and block 6 with block 13 than to match all four blocks with each other. This is important in the embodiment which breaks the circuit into two portions. As indicated earlier, this matching is most easily accomplished by incorporating the components into a common integrated circuit or at least into appropriately partitioned integrated circuits.

Finally $i_{EXP}$ flows through resistor $R_{CV}$ (15) to generate a control voltage $$V_M=i_{EXP}*R_{CV}=R_{CV}*S_A*S_C*S_C*i_{BACK}*(Ave_L(i_{DAY}/i_{FRONT}))^\alpha$$

This result may be empirically altered by additional shaping of the generally exponential conversion of $i_{EXP}$ and/or by alteration of the gains to change $\alpha$. An optional offset 16 improves the reflectance versus glare level characteristic for some electrochromic mirror elements. A voltage clamping action 14, which may be accomplished in any of several ways, is introduced in combination with an optional network in the feedback path to limit the maximum voltage to the mirror element(s). The most important factor in the characterization of the functional relationship between glare threshold and the ambient reference level is the ratio of the power of $i_{FRONT}$ to the power of $i_{BACK}$. For example, $$V_M=i_{EXP}*R_{CV}=R_{CV}*S_A*S_C*(i_{BACK}^{(1/\alpha)})*Ave_L(i_{DAY}/i_{FRONT})$$

has a similar effect on this characterization when compared to the equation for $V_M$ above. Also, taking the ratio of $i_{DAY}/i_{FRONT}$ before taking averages and exponential powers has advantages but other configurations are within the scope of the invention. The reasons for taking the difference between the values logarithmically related to $i_{DAY}$ and $i_{FRONT}$ at the point where they were taken are as follows. First, the troublesome $V_0$ term is cancelled before other signal processing is done. Second, the day detect condition for which the forward light level indicated by $i_{FRONT}$ is greater than the reference level $i_{DAY}$ is indicated by a negative voltage difference between their logarithmically related signals. Third, when the circuit is first turned on, the voltage on the time averaging capacitor is normally zero which in the embodiment described represents an average light level which is equal to the day detect threshold level. This is a good starting point because the mirror will not darken immediately when the circuit is energized, yet the voltage which represents the time average does not contain a large offsetting term such as $V_0$. As a practical matter, circuit values are normally chosen so that the component of the setpoint scaling factor $S_A$ which is introduced by the potentiometer does not have to be too large. One way to achieve an approximately correct balance is to change the other scaling factor $S_C$ by substituting multiple parallel transistors in place of one or more of the transistors used for the log or antilog conversion. n parallel transistors will increase the exponentially generated current by n times when used in place of the transistor making the exponential conversion or will respond as if the logarithmically converted current had been reduced by a factor of 1/n when used in place of the respective log conversion transistor. It is possible to scale the transistor sizes fractionally, but that is more likely to cause matching problems. It is understood that the setpoint adjustment which varies the value of $S_A$ will normally be made for a completed circuit to obtain the desired sensitivity and that circuit changes which may affect the sensitivity will ultimately be corrected by such an adjustment.

The outside mirror elements often need to be driven by a slightly different voltage level than the inside mirror element in order to obtain the desired reflectances for all of the mirror elements for the given situation. The drive voltages may be derived by using separate amplifiers to drive each mirror element or set of mirror elements but this approach is expensive. Another solution is to include a component which introduces a voltage drop in series with the mirror element or elements which require the lower drive voltage. However, for voltage differences of much less than 0.6 volt, components which give a stable voltage drop of the desired level and which are adequately stable with variations in mirror element current and with ambient temperature are difficult to find. This problem is avoided by the use of two voltage drops which may even vary considerably with temperature and other conditions but which generally track each other while maintaining a voltage difference equal to that needed between the two element groups. In the block diagram, voltage drop #1 in block 32 and voltage drop #2 in block 33 are designed to generally track each other but to have voltage drops which differ by the amount by which the voltages to the two elements or sets of elements need to differ from each other. This voltage difference may be either fixed or variable and may, for example depend on the voltage on one or the other of the mirror elements. The block having the lower voltage drop is used in series with the element(s) which require the higher operating voltage. This technique maintains the required difference in voltage drive level between the elements while sharing the common power amplifier with its associated protection circuits. This technique can be extended to provide more than two different voltages by providing additional voltage drops. When the different voltages are not required, voltage drop #1 in block 32 is replaced by a short and the elements are driven in parallel with mirror M1.

When the glare condition is such that the voltage level is above a threshold, chosen at 0.2 volt in this embodiment, the output of comparator 21 is high or true. When $i_{FRONT}$ is less than $i_{DAY}$, $i_{DAY}/i_{FRONT}$ is greater than 1 making $\ln(i_{DAY}/i_{FRONT})$ positive. Comparator 22 detects this condition with a high or true compare output for $i_{DAY} > i_{FRONT}$. When the automobile is not in reverse gear, the signal 23 from the back-up lights is low and the signal 25 after conditioning and inversion in this embodiment is high. When the three inputs to gate 26 are true, amplifier 18 is enabled to dim the mirror elements and the output of inverter 27 is low or false to turn off the mirror shorting transistors. When any of the three conditions above are false, the amplifier 18 is disabled by a false signal from gate 26 to prevent current from being supplied to the mirror elements and shorting transistors 29 and 31 are turned on by a high output from inverter 27 to speed clearing of the mirror elements or element groups represented by M1, M2 and M3.

In some designs it is desirable to break the setpoint block into a calibration section and a user adjustable section. The adjustment may be either in the form of a selection from two or more choices or as a continuous or quasi-continuous setting such as provided by an adjustable potentiometer or rheostat. For such an arrangement it is first normally desirable for the calibration adjustment to have approximately the same effect on the setpoint for any of the user, adjustable settings. Secondly, it is often desirable to alter the glare threshold versus ambient reference level slope characteristic as denoted by $\alpha$ as well as the setpoint calibration as denoted by $S_C$. As an example, let us formulate requirements for a mirror which has high and low user selectable sensitivity settings, the low setting being particularly sensitive. Assume also that it is desirable to increase the sensitivity more in going from the low to the high sensitivity setting when the ambient reference is low than in going from the low to the high sensitivity when the ambient reference level is high. The reason is that a large increase in sensitivity in going from low to high sensitivity when the ambient reference level is high would cause problems with nuisance dimming at dawn and at dusk as discussed hereinabove. With the unique flexibility of the present invention, the $\alpha$ and the $S_C$ may be specified almost independently for different calibration settings. FIG. 4 is a plot of the performance of a mirror which comes very close to meeting the requirements set forth above. The control circuit of FIG. 2 with the modifications for the adjustable slope and adjustable sensitivity and for the independently adjustable calibration from FIGS. 2A1 and 2A2 is the one whose performance is plotted in FIG. 4.

Below some minimum ambient light level (nominally about 0.2 lux), a driver's sensitivity to glare is not altered much by further decreases in the ambient light level. Block 37 indicates a function whereby either a soft or a hard lower limit is placed on the signal from the ambient light sensor. The limiting action may be introduced in any of a number of ways and at any of a number of points within the circuit. Some embodiments use a resistor in parallel with the front sensor of block 5 and one embodiment uses a temperature compensated voltage clamp on the signal from block 10.

CIRCUIT DESCRIPTION

Figure 2:
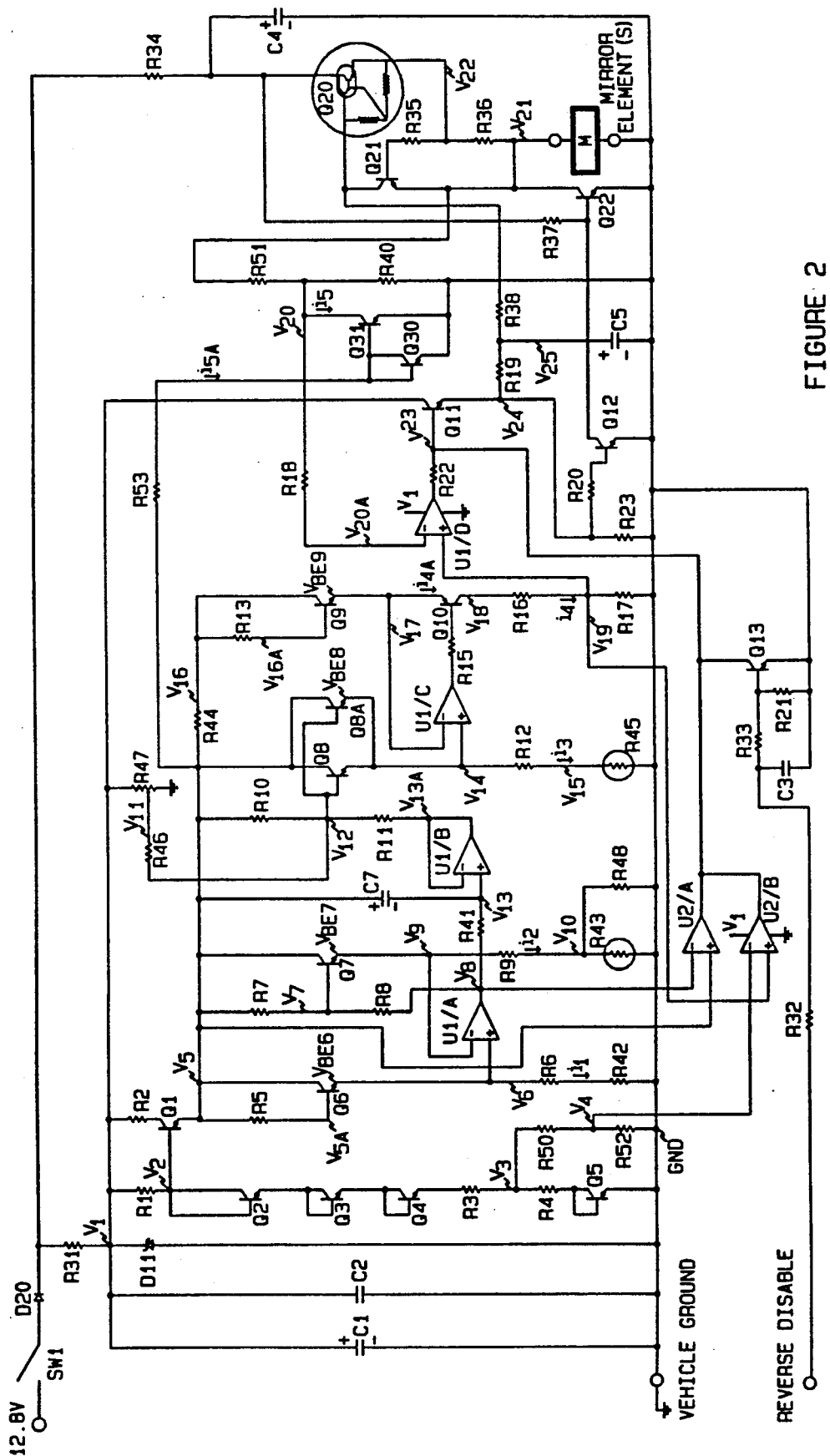
FIG. 2 is a schematic circuit diagram of another embodiment of the invention.

Refer to the circuit diagram in FIG. 2. Power is supplied at the 12.8 volt input terminal and at the vehicle ground terminal. The reverse disable line is normally connected to the back-up lights so that a positive voltage appears at this terminal when the vehicle is in reverse. Switch SW1 is optionally provided to enable the user to turn off the mirror so that the mirror elements will remain in their highest reflectance state. D20 protects the circuit from a reversed voltage on the 12.8 volt supply lead. R34 limits current and C4 absorbs energy to limit the voltage excursion caused by high voltage transients on the 12.8 volt supply. Current from the supply flows through D20 and is limited by R31 and clamped by Zener diode D11. C1 and C2 filter the supply $V_1$ which is regulated by the clamping action of D11. R1, R3 and R4, and diode connected transistors Q2, Q3, Q4 and Q5 form a divider chain to derive voltages $V_2$ and $V_3$. R2 limits current in case of a short. The base of transistor Q1 is connected to $V_2$ in an emitter follower configuration to supply a voltage $V_5$ to which much of the computational circuitry is connected. The diode connected transistors Q2, Q3, Q4 and Q5 are configured so that the effect of temperature on the voltage across each of them in combination with the voltages on D11, R1, R3, R4, and on the base to emitter of transistor Q1 and of transistor Q6 maintain a voltage which is relatively insensitive to temperature change at $V_6$. R43 is the ambient light sensor and R45 is the glare sensor. R42 is a resistor which establishes a day detect threshold level, its resistance being approximately equal to the resistance of the parallel combination of R43 and R48 at the day detect threshold which has been chosen at approximately 33 lux. The resistor R48 is chosen so that for light levels above 1 lux its contribution to the current $i_2$ is relatively minor compared to that of ambient light sensor R43; but below 0.1 lux the contribution of R43 to the current $i_2$ is relatively minor compared to that of R48. Thus, to look at it in a qualitative way, for very low actual ambient light levels, R48 makes it look like the ambient light has settled to a relatively constant but moderately low light level. As a result, the ambient reference level is not permitted to change in a way that would cause the circuit sensitivity to light from the rear to increase without limit for very low ambient light conditions. This is an appropriate use of R48 in which its negligible effect for high ambient light levels and its dominant effect for very low ambient light levels with a smooth transition between the two is what is desired. It is also an example of why the use of parallel resistors is not a good way to adjust the overall slope characteristic of the glare threshold versus the ambient reference level. R9 and R12 have resistance values that are low enough that they do not have a drastic effect on the mirror calibration through most of its operating range. Their primary function is to limit the current supplied to sensors R43 and R45 when the light level is very high causing the sensor resistances to be very low. R6 is included to generally balance the effect of R9.

$V_{BE7}$ is the base to emitter voltage of transistor Q6. $V_{BE6}$ corresponds to the signal from block 2 of FIG. 1 and is logarithmically related to the current $i_1$ which is indicative of the day threshold. $V_{BE7}$ is the base to emitter voltage of Q7. $V_{BE7}$ corresponds to the signal from block 4 of FIG. 1 and is logarithmically related to the current $i_2$ which is indicative of the ambient light level. $V_{BE8}$ is the base to emitter voltage of transistor Q8. $V_{BE8}$ corresponds to the signal from block 6 of FIG. 1 and is logarithmically related to the current $i_3$ which is indicative of the rearward or glare causing light level. $V_{BE9}$ is the base to emitter voltage of transistor Q9. $V_{BE9}$ corresponds to the signal input to block 13 of FIG. 1 and is logarithmically related to the current $i_4$. The current $i_4$ is indicative of the degree to which the mirror should be dimmed. Although it is a minor point, the resistors R5, R7, R10 and R13, each from $V_5$ to the respective base of Q6, Q7, Q8 and Q8A, and Q9 each have low enough resistance values so the voltage drop across each of them due to the respective base current which they supply is small. These voltage drops do introduce non-ideal effects into the logarithmic computation; but since the voltage drops are small and cancel each other to some degree, their effects may be neglected. Other choices of resistance values are within the scope of the invention and could be used to optimize the reduction of the effects of the base currents for a particular situation.

Neglecting the effects of the base current of Q7, the voltage divider ratio due to the resister pair R7, R8 is, $$(V_5-V_8)/(V_5-V_7)$$

and corresponds to the gain AG in block 9 of FIG. 1. Here the voltage $(V_5-V_8)$ is the potential of $V_5$ relative to $V_8$. It is easier to take the voltage measurement of $V_8$ relative to $V_5$ and reverse the sign. The sense chosen in the most convenient to correlate with the calculations and with the $V_{BE}$ voltages so will be used for most of the measurements which include $V_5$. The gain $\alpha/AG$ in block 11 is more complicated to derive. The resistance of R46 is intentionally made large in comparison to R10 and the resistance of potentiometer R47 is low enough so that the source impedance looking back into R47 from the wiper at $V_{11}$ is smaller than the resistance of R46. To determine the value of R10 in what follows, the impedance from the base of Q8 through R46 and through the wiper of R47 to ground will vary from about 47,000 ohms with the wiper at either extreme position of the potentiometer to about 72,000 ohms for the wiper in the middle of the potentiometer. The variation in the divider ratio caused by adjustment of the potentiometer is small enough to neglect. To adjust the circuit for a given value of $\alpha$, the value of R10 or optionally R11 is adjusted so that when negating the offset introduced by the setpoint pot, $$(V_5-V_{12})/(V_5-V_{13A})=\alpha*(V_5-V_7)/(V_5-V_8)$$

which is the fractional gain of $\alpha/AG$ of block 11 of FIG. 1. The offsetting effect of the setpoint R47 may be negated by temporarily disconnecting the ends of potentiometer R47 from $V_1$ and from ground and reconnecting both of them to $V_5$. When R10 and R11 are included in an integrated circuit, it is desirable to provide for a shunt or series resistor external to the integrated circuit to provide a means to adjust $\alpha$ for a particular application.

In the discussion which follows, the efects of the base currents on $V_{5A}$, $V_7$, $V_{12}$, and $V_{16A}$ will be neglected so that $V_{BE6}$ is assumed to be equal to $(V_5-V_6)$ etc. Also, the gains represented by the long equations above will be represented by their symbolic equivalents AG and $\alpha/AG$ as defined above. Operational amplifier U1/A maintains $V_8$ so that $V_9$ is substantially equal to $V_6$ and $(V_5-V_7)$ is thus substantially equal to $(V_{BE6}-V_{BE7})$. Therefore $(V_5-V_8)$ which is equal to $AG*(V_5-V_7)$ is also equal to $AG*(V_{BE6}-V_{BE7})$. This corresponds to the signal from block 9 of FIG. 1 as it is introduced to the averaging circuit of block 10. R41 and C47 perform the averaging function by applying a time constant of about 15 seconds to the signal. Operational amplifier U1/B is used as a unity gain voltage follower so that $V_{13A}$ is equal to $V_{13}$ and $V_{13}$ corresponds to the signal out of block 10 in FIG. 1. As explained hereinabove, the value of R10 is adjusted so when negating the offsetting effect of the setpoint pot, $$(V_5-V_{12})/(V_5-V_{13})=(a/AG)$$

or, $$(V_5-V_{12})=(a/AG)*(V_5-V_{13})$$

which corresponds to the signal out of block 11 of FIG. 1. The current from potentiometer R47 through R46 causes a change in the voltage $(V_5-V_{12})$. This change in voltage is the setpoint contribution represented by the summation of the signal from block 1 in block 12 of FIG. 1. For example a setting of R47 which results in a 0.018 volt increase in $V_5-V_{12}$ approximately doubles the factor $S_A$. Transistors Q8 and Q8A which are each similar to transistors Q6, Q7 and Q9 are placed in parallel so that the effect of the glare related current $i_3$ on the logarithmically related voltage $V_{BE8}$ is cut in half. This has the effect of halving the factor $S_C$ in FIG. 1. The voltage $V_5-V_{14}$ then represents the sum of the logarithmically related signals from the time averaging circuit, the setpoint circuit, and the glare sensing circuit and corresponds to the output of block 12 of FIG. 1. Note that the constant K of FIG. 1 is a factor in the logarithmic value represented by $V_5-V_{14}$ and that the one additive term $V_0$ from the parallel Q8 and Q8A combination is also included in $V_5-V_{14}$.

R44 is optional being replaced by a short when not used and we will first consider the option for which it is not used and is replaced by a short. Operational amplifier U1/C serves to hold $V_5-V_{17}$ equal to $V_5-V_{14}$. The additive $V_0$ terms for Q9 and for the parallel combination of Q8 and Q8A cancel each other. Neglect the small voltage on R13 as was done for the other log transistors. Then the U1/C, R15, and Q10 combination controls the current $i_{4A}$ from the emitter of Q9 so that $V_{BE9}$ equals the sum of the three logarithmically related signals represented by $V_5-V_{14}$. Since $V_{BE9}$ is logarithmically related to $i_{4A}$, the inverse relationship is true and $i_{4A}$ is exponentially related to $V_{BE9}$. Thus, $i_{4A}$ represents the antilogarithm of the logarithmic sum introduced at $V_{BE9}$. $V_{BE9}$ is substantially equal to $V_5-V_{17}$ which is in turn substantially equal to $V_5-V_{14}$ which is the term whose antilog was to be taken, that is for which an exponential conversion was to be made. Thus, $i_{4A}$ is the desired exponentially converted value. The current gain of Q10 is reasonably high so that for practical purposes $i_4$ is equal to $i_{4A}$ and $i_{4A}$ corresponds to the current output of block 13 of FIG. 1. $R_{17}$ corresponds to $R_{CV}$ of FIG. 1 and $V_{19}$ which equals $i_{4A}*R_{17}$ corresponds to $V_M$ of FIG. 1. The voltage $V_{19}$ is the voltage from which the mirror drive signal is derived. Possible further shaping, amplification, and/or logic processing, and even possible combination with signals from another path may be introduced between $V_{19}$ and the mirror drive level. Several of these possibilities are included in the preferred embodiment.

In the preferred embodiment, the maximum voltage to the mirror element depends on the maximum voltage of $V_{19}$. R16 limits this voltage to a maximum value of approximately 1 volt which is obtained when Q10 saturates. This limiting action corresponds to block 14 of FIG. 1 and can be achieved in a variety of alternate ways.

U1/D, R22, Q11, R19, C5, R38, Q20 and R36 generally form the forward portion of the amplifier control loop which supplies the drive voltage signal to the mirrors which is related to the voltage $V_{19}$. The feedback loop from the mirror element voltage is through the resistor network R51, R40 and R18. The optional current mirror formed by R53, Q30 and Q31 increases the voltage $V_{21}$ to the mirror element by a constant increment as will be explained hereinafter. Since the current into the inputs of U1/D is very small, there is a negligible voltage drop across R18 which is in the circuit only to protect the inverting input of U1/D from externally introduced voltage transients. Thus, $V_{20A}$ is substantially equal to $V_{20}$. The action of the forward portion of the amplifier control loop in combination with the feedback is to hold the voltage $V_{20A}$ substantially equal to $V_{19}$ while the amplifier is operating. The circuit just described corresponds to block 18 of FIG. 1.

The effect of the components in the feedback loop is as follows. First neglecting the effect of $i_5$ from the optional current mirror, $$V_{21}=V_{20}*(1+R51/R40)$$

so that resistors R51 and R40 have introduced a gain into the circuit. Further some mirror elements have a higher threshold voltage for which the mirror element begins to dim than do others. For such elements, it is desirable to add a relatively constant increment to the controlling voltage $V_{21}$. Q30 and Q31 are preferably matched transistors integrated on the same silicon chip so that the current $i_{5A}$ caused by the voltage $V_5$ on R53 is mirrored as a nearly equal current $i_5$. Operational amplifier U1/D holds the voltage $V_{20}$ substantially equal to $V_{19}$ independently of the current $i_5$. Thus, the current $i_5$ is supplied by the increase, $$V_{inc}=i_5*R51$$

in the voltage across R51 and $V_{inc}$ is the constant amount by which the voltage $V_{21}$ to the mirror is increased by $i_5$. This corresponds to the action of blocks 16 and 17 of FIG. 1. Now let us return to the resistor R44 and assume that it has a nonzero value. The voltage $V_5-V_{17}$ is now shared between the voltage $V_{BE9}$ and the voltage drop across R44. As $i_{4A}$ is increased, the voltage across R44 increases decreasing the amount of increase in the voltage $V_{BE9}$ which controls $i_4$ thereby decreasing the amount of increase in the magnitude of $i_4$ with increasing glare level. This has the effect of reducing the increment by which the mirror reflectance is decreased for a given increment of increase in the glare level. The values of R44, R53, R51 and R40 are adjusted in combination to experimentally characterize the amount of light reflected to the driver versus the glare level through the control range of the mirror. The characterization of the relationship between the glare level and the light reflected to the driver is a very important aspect of the circuit design which need not be elaborated upon here because of its treatment in U.S. Pat. No. 4,917,477 which is incorporated herein in its entirety by reference.

Comparators U2/A and U2/B have open collector output stages similar to the transistor Q13 so that when any of the three outputs of U1/A, U1/B, or Q31 are in their low or on state, they pull $V_{23}$ close to ground which turns Q11 causing Q20 to be turned off thereby preventing the circuit from supplying current to the mirror element(s). The turn off of Q11 also turns off the supply of current through R20 to the base of Q12 turning off Q12 and allowing current from R37 to turn on transistor Q22 thereby shorting the mirror element(s) M. This corresponds to the action of elements 26, 27, 28, 29, 30 and 31 of FIG. 1. FIG. 1 shows a more general case having two shorting transistors 29 and 31 in place of the single Q22 of FIG. 2. R23 serves to speed discharge of C5 when Q11 is turned off.

When U2/A, U2/B and Q13 are all in their high or off states, the voltage $V_{23}$ is not altered significantly and the amplifier circuit drives the mirror element. C5 permits U1/D to operate in a switching mode, averaging the voltage $V_{24}$ to $V_{25}$ and providing for satisfactory operation when the loop which includes U1/D stable or unstable. When the loop is stable, U1/D operates in its linear mode, and when the loop is unstable, U1/D operates as a switching comparator. The relatively slow slew rate of the output of U1/D prevents the generation of objectionably high radiated noise due to the switching action.

With respect to the operation of U2/A, U2/B and the circuit containing Q13, the action of these devices and their associated circuits correspond, respectively, to blocks 22, 21 and 24 of FIG. 1. The logic function performed by the common connection of the open collector transistors from the three logic elements is depicted by and gate 26 of FIG. 1. When the ambient light level is higher than the day threshold, the current $i_2$ through the ambient light sensor combination R43 and R48 is higher than the current $i_1$ through day condition reference resistor R42 causing $V_{BE7}$ to be greater than $V_{BE6}$ and $V_7$ and thus $V_8$ to be greater than $V_5$ so that the output of comparator U2/A is low which inhibits dimming of the mirror. Likewise, if the glare level is low enough that $V_{19}$ is less than the reference voltage $V_4$ which is created by the resistance divider R50 and R52 which is supplied by $V_3$, then the output of U2/B is low which inhibits dimming of the mirror. If the vehicle is in reverse, the back-up light voltage at the reverse disable input supplies current through R32 and R33 to turn on transistor Q13 which inhibits dimming of the mirror. With the mirror circuit energized and none of these three conditions, the variable voltage is applied to the mirror to drive it to a variable reduced reflectance level.

C3 filters the reverse disable signal and R21 increases the switching threshold of the reverse disable input. This corresponds to the signal conditioning in block 24 of FIG. 1.

When the current to the mirror elements is excessive, voltage on current sensing resistor R36 is high enough to supply current through R35 to Q21 which turns it on and limits the drive to the Darlington output transistor Q20, thus limiting the output current to the mirror element(s). This corresponds to block 19 of FIG. 1.

Refer to the circuit diagram of FIGS. 2A1 and 2A2 where a number of alternative features are shown. These features include the use of the photodiodes in place of the photoresistors for light sensing, the use of a circuit to supply different voltages to the separate groups of elements, the use of a user adjustable calibration which changes the slope characteristic of the glare threshold versus the ambient reference level and simultaneously changes the calibration of the glare threshold level for a given ambient reference level, the use of a slower time constant for the filtering of decreasing than for increasing ambient light levels, and the partitioning of the circuit into sub-circuits, a different sub-circuit being closely associated with each of the light sensors.

These four options may be selected in any combination. The numbering for components which have not changed from those of FIG. 2 are retained and the overall circuit operation is similar so that only components which have changed or have been added will be described.

First, the cadmium sulfide photoresistors R43 and R45 have been replaced by silicon photodiodes D43 and D45. The current levels $i_{2A}$ and $i_{3A}$ which are indicative of the ambient and the rearward light levels are much lower and operational amplifiers U1/A, U1/B, U1/C and U1/D and comparators U2/A and U2/B have been replaced with operational amplifiers U5/B, U3/B, U3/C and U3/D and comparators U6/A and U6/B, respectively, which have very much lower input leakage and bias currents. Also, the transistors Q6A, Q7, Q8 and Q9A need to be selected for low leakage characteristics. Multiple parallel transistors Q6A and Q9A configured as shown in FIG. 2B have been used in FIGS. 2A1 and 2A2 in place of the single trasistors Q6 and Q9, respectively, which were used in FIG. 2. Also, parallel transistors Q8 and Q8A of FIG. 2 are replaced by the single transistor Q8 in FIG. 2A1. Capacitor C7 is replaced with a nonpolar capacitor C7A because of a higher reverse voltage which may appear on C7A under some conditions. Resistors R42A, R44A, R48A, R16A and R17A have higher resistance values to operate with the much lower photodiode currents but otherwise perform generally the same functions as do the corresponding resistors which do not have the "A" suffix in FIG. 2. R70 is added so that enough current is drawn from transistor Q1 to maintain reasonable regulation on $V_5$. With the four parallel transistors used for Q6A, $i_{1A}$ must be approximately 4 times as great as $i_{2A}$ generate equal base to emitter voltages on Q6A and Q7. To offset the effect of this change, R42A is made one fourth of the resistance that would otherwise be used. The drastic decrease in the current versus light level of D43 versus the photoresistor R43 of FIG. 2, the increases in the resistances of R42A and R48A, and the change to the multiple transistor Q6A combine to have an approximately neutral effect on $S_C$ of FIG. 1 when comparing the circuit of FIG. 2A2 with that of FIG. 2. The drastic decrease in the current versus light level of D45 versus the photoresistor R45 of FIG. 2, in combination with the effect of approximately doubling the effect of $i_{3A}$ by eliminating Q8B, the effect of approximately quadrupling $i_{4B}$ by going to four parallel transistors for Q9A, and the effect of multiplying R17A by approximately 25 by increasing its resistance by 25 fold also combine to have an approximately neutral effect on $S_C$ of FIG. 1 when comparing the circuit of FIG. 2A1 with that of FIG. 2. With the above changes, overall operation of the circuit with the photodiodes is comparable to that of the circuit with the photoresistors.

Now refer to the resistor and switch network formed by R10, R11, R46, R47, R60, R61, R62 and SW2 of FIG. 2A1. As described for FIG. 2, the divider ratio between point 102 and point 100 relative to other circuit parameters is what determines the value of $\alpha$ for the circuit and this in turn determines the slope of the curve depicting the glare threshold versus the ambient reference level. This divider ratio may be reduced by placing a resistance in parallel with R10 and this has the effect of reducing $\alpha$. Furthermore, voltage offsets caused by biasing networks at point 100 change the calibration factor $S_C$ for the control circuit. A biasing network which increases the voltage at point 100 relative to ground decreases $S_C$ and a biasing network which reduces the voltage at point 100 relative to ground increases $S_C$. Thus, by independently selecting the source impedance and source voltage of a network which is connected to point 100 by a switch, the $\alpha$ and the $S_C$ values may be changed independently. Placing a resistance in series with R10 decreases the value of $\alpha$, therefore, the condition for which the switch is open must be chosen as the one with the highest $\alpha$. Potentiometer R47 is then adjusted to give the desired value of $S_C$ for this open setting. R62 may be sized appropriately and connected to a voltage which is more positive (negative) than point 100 to decrease (increase) $S_C$ with the switch closed. R61 and R62 are chosen so that when the switch is open, adjustment of R47 causes approximately equal incremental changes in the voltages at points 100 and 101. This results in a balanced effect of the calibration pot R47 on the operation of the mirror with SW2 open and with SW2 closed. Otherwise, adjustment of the calibration would also alter the relative sensitivities of the circuit with SW2 open and with SW2 closed to an undesirable degree. Many variants of the setpoint and calibration are possible. R10 can be made variable to adjust $\alpha$, perhaps to compensate for the relative slopes of the current versus light levels for the ambient and the glare causing light sensors. SW2 can be replaced with a rheostat or a potentiometer to provide a continuous user adjustment between two extreme conditions of independently established $\alpha$ and $S_C$ pairs. Simple replacement of SW2 with a rheostat which goes from a high to a low resistance will give a relatively smooth transition between the two paired $\alpha$-$S_C$ conditions. More elaborate schemes with multiple resistor networks and a selector switch or with a potentiometer which uses taps to alter conditions of impedance and potential along the wiper path are possible and within the scope of this invention. An alternate method is to use ganged or individually adjustable pots where one is configured to primarily change $\alpha$ and the other is configured to primarily affect $S_C$.

Q22 and Q23 correspond to the shorting transistors 29 and 31 of FIG. 1. R57 and R58 correspond to resistors 28 and 30 of FIG. 1. Q24, R54 and R56 correspond to voltage drop #1 in block 32 of FIG. 1. The voltage drop #1 is equal to the voltage across R54 plus the base to emitter voltage of Q24. The voltage across R54 is increased by current to R56 and is also partially dependent on the mirror voltage since an increase in the voltage on M1 increases the voltage on R56 increasing the current through it and through R54. Q25 and R55 correspond to voltage drop #2 in block 33 of FIG. 1. R55 is of relative low resistance and the only current through R55 is from the relatively low base current to Q25. Thus, the voltage across R55 is small and voltage drop #2 is nearly equal to the base to emitter voltage of Q25. This approximately matches the base to emitter voltage on Q24 so the voltage supplied to M1 is less than that supplied to M2 and M3 by approximately the amount of the voltage across R54 due to the current drawn by R56. The source resistance of the parallel combination of R54 and R56 at the base of Q24 is balanced against the resistance of R55 so that the added voltage drops on R54 and R55 due to the respective base currents will approximately cancel each other. The feedback is from M1 through R51 so the voltage on M1 is relatively independent of the voltage drop #1 and the voltage on M2 and M3 is equal to the voltage on M1 plus voltage drop #1 minus voltage drop #2.

R41 from FIG. 2 is increased in value to R41A and R41B, D21 and U3/A are added to form a time average for which the time constant for averages moving toward a decreased average light level is different than and normally longer than the averages moving toward an increased average light level. The improvement over prior art is that the signal being averaged is approximately equal to the logarithm of the ambient light level. This is referred to as a logarithmically weighted average.

When the signal from the ambient light sensing means is converted to its logarithmically related form and then averaged, a given percentage change in the signal from the ambient light sensing means results in a given increment in the logarithmically related value regardless of the starting value of the signal from the ambient light sensing means. This constant increment has a desirable uniform effect on the average. Furthermore, in the preferred embodiments, except for ambient light levels which are too low to significantly alter the driver's perception of glare, the signal from the light sensor is approximatly proportional to the ambient light level. Thus for ambient light levels in ranges which significantly affect the driver's perception of glare, the logarithmic conversion responds to equal percentage changes in the ambient light level by producing approximately equal incremental changes in the logarithmically converted signal level which is averaged. These approximately equal percentage changes in the ambient light level then have approximately equal effects on the time average. With bridge configurations such as used in U.S. Pat. No. 4,886,960, the response to equal percentage changes in the ambient light level varies greatly depending on the actual ambient light level even for ambient light levels which are high enough to significantly alter the driver's perception of glare. The result is that the average favors those light levels for which the change of a given percentage in the ambient light level creates the larger increments of change in the signal which is averaged.

The photocurrents which indicate the light level impinging on the photodiodes are extremely low. This makes the circuit very susceptible to malfunction from leakage currents caused by moisture and the effects of capacitively, magnetically, or electromagnetically coupled interference. One way to sidestep these problems is to package each of the sensors with an amplifier. Sensors with integral amplifiers have been applied to mirror control applications. Prior art devices have used sensors with closely associated amplifiers. However, known prior art devices of this type have used identical combined photosensor amplifier sensors for the front and the back sensors and have not integrated processing specific to the mirror control function in these blocks. Thus, the mirror control function was still performed by an additional circuit which was not closely associated with the sensors. Because of the large ranges of light level which must be measured including extremely low light levels which must be measured over a large temperature range, it is advantageous to incorporate the signal processing stage of the mirror control directly along with the amplification of the signals from the mirror sensors rather than treating these as substantially separate functions. It is also advantageous to combine the majority of the signal processing function with the already customized sensing functions rather than to require a third major signal processing component in the circuit. Note that one of the distinguishing features of this arrangement is that the signal processing surrounding the ambient light sensor is different than that surrounding the rear sensor so that the circuit which is partitioned with the ambient light sensor is different than the circuit which is partitioned with the rear sensor. The partition used takes advantage of the fact that the signal $V_8$ which indicates the logarithm of the ratio of the ambient light level to the day threshold is the only signal required from the circuit of FIG. 2A2 which is associated with the ambient light sensor. This reduces the number of signals which must be passed between the two circuit blocks.

PROCESSING THE LIGHT LEVEL SIGNALS

Figure 3A:
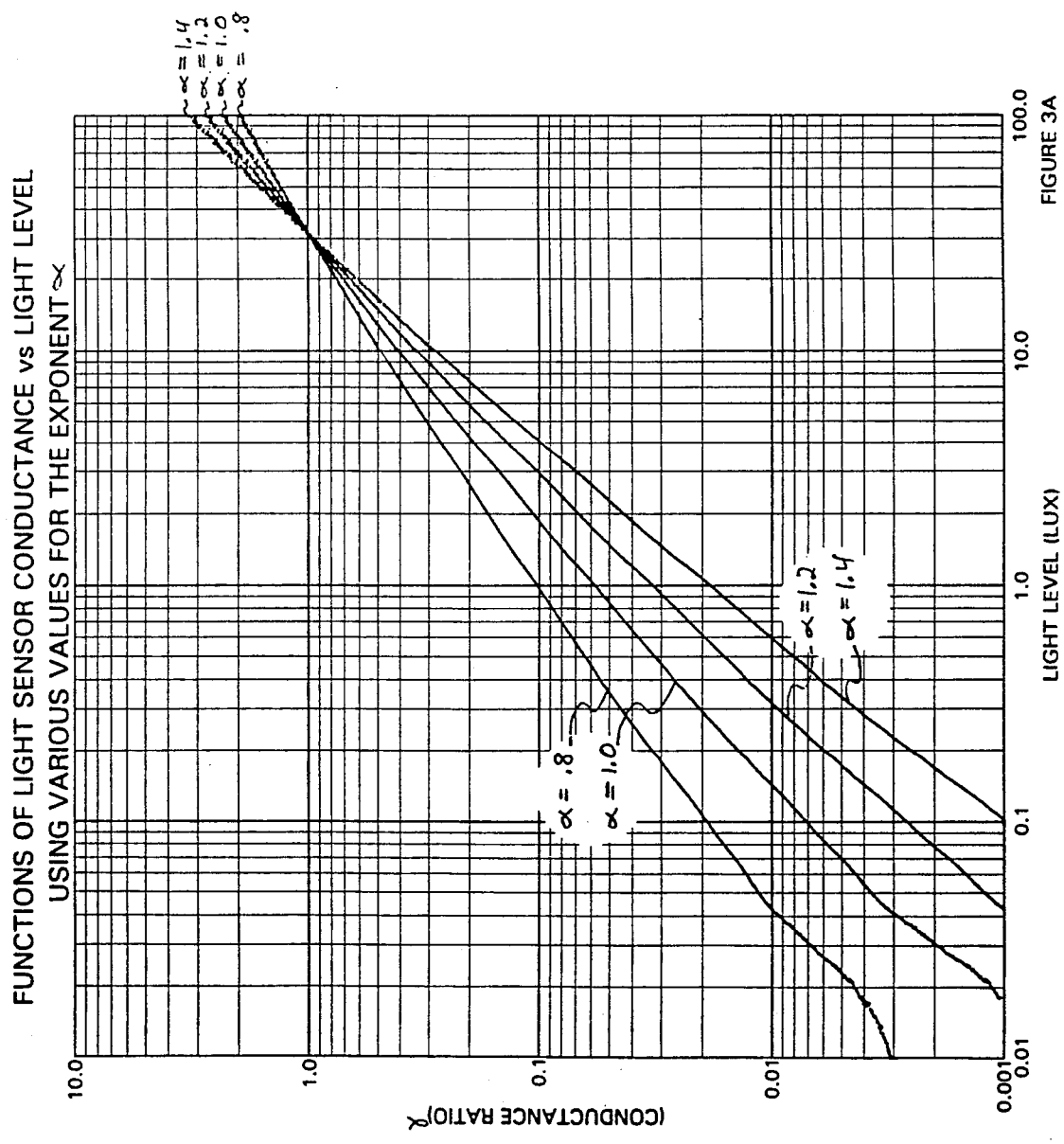
FIG. 3A illustrates plots of functions of light sensor conductance versus light level using various values for the exponent $\alpha$.

In FIG. 3A the ratio of the sensor conductance to its conductance at 33 lux is raised to the $\alpha$ power and plotted as a function of the light level striking the sensor. Plots are shown for the exponent $\alpha$ equal to 0.8, 1.0, 1.2 and 1.4 Note the direct control of the slope for each of these curves over the entire range of the plot. The plots in FIG. 3A are not intended to directly indicate the performance of the mirror but rather to illustrate the general beneficial effect of using the function with the exponent $\alpha$ as contrasted with the effect of using the series and the parallel resistor configurations in FIG. 3B.

In FIG. 3B three plots of conductance versus light level are shown. The first plot 300 is of the conductance of the photoresistive light sensor which has a resistor having a 100 k ohm resistance (10 micro-ohm conductance). Note that for light levels above 10 lux, the conductance is low enough to dominate the much lower conductance of the parallel resistor and the conductance of the sensor and parallel resistor combination closely tracks the conductance of the sensor only which is the center, approximately straight line curve 301. For light levels below 0.1 lux, the higher conductance of the parallel resistor dominates and the conductance of the sensor and parallel resistor combination is nearly constant. This configuration is good for providing a "limiting" action at one extreme of the light level range. For example, the resistor R48 of FIG. 2 is used in parallel with the ambient light sensor to cause the output signal to "settle" to a nearly constant limit when the ambient light levels are very low. For such purposes the parallel resistor is very good, but, for causing a reasonably uniform shift in the slope of the front sensor output over a large light level range, it is not satisfactory at all. The functions in FIG. 3A with the adjustable exponent $\alpha$ are clearly superior for this purpose.

The conductance of the sensor in combination with a series resistor is shown by plot 302 and is essentially the mirror image of the parallel resistor combination shown in plot 300. The conductance of the sensor and series resistor combination nearly matches the conductance of the sensor only for very low light levels and settles to a nearly constant conductance for very high light levels. The effect is just as inappropriate as that of the parallel combination for causing a reasonably uniform shift in the slope of the front sensor output over a large range of light levels.

When bridge circuits and resistor networks are used the effects amount to combinations of series and parallel resistors. It is true that somewhat better shaping can be achieved by "playing" the effects of several parallel and series combinations against each other, but this is cumbersome and inflexible when compared to the ability with the device of the present invention to change the exponent and get the slope change that is needed over a very large range by adjusting only one or two resistance values. Known prior art devices for which attempts have been made to characterize the glare threshold as a function of the ambient reference level have depended mainly on the techniques of FIG. 3B and in some cases on the even more radical and generally less desirable shaping caused by introducing one or perhaps two diodes into the circuit. It is not surprising that prior art devices have had very limited success in the improvement of the functional characteristic between the glare threshold and the ambient reference level.

EXAMPLES WITH COMPLETE MIRROR CONTROL CIRCUITS

In the plots FIG. 3C, a mirror and control unit similar to that of FIG. 2 was used and the value of R11 was adjusted to obtain the various values of $\alpha$ for which the response characteristics are plotted. For each of the curves, the ambient light level was slowly ramped from about 0.02 lux to 100 lux and the rearward light level was adjusted to maintain the reflectance of the mirror element at approximately 50 percent. The curves in the graph are plots of this rearward light level which causes the mirror element reflectance to go to 50 percent plotted along the y axis against the ambient light level plotted along the x axis. The reduction in the slope of each of the plots in FIG. 3C for low light levels is desired and is due primarily to the resistor R48 of FIG. 2. The plots in FIG. 3C differ from those of FIG. 3A as expected, but note the similarity in the way that the different values of $\alpha$ alter the slopes of the curves in each of the two figures.

In the plots of FIG. 4, a mirror and control unit similar to that of FIG. 2 is used except that R60, R61, R62 and SW2 of FIG. 2A1 have been added to provide for a user accessible sensitivity switch SW2. For each of the curves, the ambient light level was slowly ramped from about 0.02 lux to 100 lux and the rearward light level was adjusted to maintain the reflectance of the mirror reflectance at approximately 50 percent. The switch SW2 is accessible to the user and provides a lower glare threshold ($S_A$) and higher slope ($\alpha$) setting when the switch is open and a higher glare threshold ($S_A$) and lower slope ($\alpha$) setting when the switch is open. The Potentiometer R47 provides a calibration adjustment. FIG. 4 has four plots, two, 401 and 402, at a first calibration setting of R47 and two, 401a and 402a, at a second calibration setting of R47. These curves generally meet the criteria set forth in the circuit description of the function and the choice of values of R10, R11, R46, R47, R60, R61, R62 and SW2 was made in accordance with the description in FIG. 2A1. Note here that plots such as those in FIGS. 3C and 4 are invaluable if not necessary to monitor device performance in order to make appropriate adjustments to the component values to arrive at the desired characterization of the functional relationship between the glare threshold and the ambient reference level. It should be understood from a review of the description of the circuit of FIG. 2A1 and from what is presented here that the circuit has the flexibility to accomplish many changes. To cite some rather extreme possibilities, the value $S_A$ could be altered so that curve 401 with the switch closed would intersect or even lie entirely below curve 402. Such changes could be made in a way which would result in generally similar characteristics for curves 401a and 402a.

The general characteristics of 401 being above 402 and the slope of 402 being greater that the slope of 401 hold also for 401a and 401b but there are dissimilarities between the set of curves 401 and 402 and the set of curves 401a and 402a. For example, the slopes of the curves in the set 401a and 402a are generally lower than the corresponding slopes for the curves in the set 401 and 402. Also, with back light levels which are lower than 0.08 lux, there are irregularities in the curve 402a generally in portion 403 of the curve. If the conductances of the photocells were exactly proportional to the light level, the curve set 401a and 402a would look more as if they had been formed by translating the curve set 401 and 402 downward on the graph and then copying them. Curve 301 of FIG. 3B is the plot of conductance versus light level for a photocell which is nearly identical to the ones used in the mirror and control used to generate the plot of FIG. 4. Notice that the plot 301 although generally linear does deviate from the straight, dashed line 304 which has been placed on the figure as a reference. Note two features of the curve 301 in particular. First, the portion of the curve 305 is generally irregular for light levels below 0.08 lux. Secondly and more importantly, the remainder of the curve 301 for light levels above 0.08 lux is generally concave downward so that the slope of the curve 301 generally decreases with increasing light levels. The likely cause of much of the irregularity of plot 402a at 403 is the corresponding irregular performance of many photocells at these low light levels.

In what follows, the incremental changes refer to increments on the logarithmic scales as used in the graphs of FIGS. 3B and 4. Another way to view the decreasing slope of the curve 301 with increasing light level is to note that for increasing light level, a greater incremental change in light level is required to produce a corresponding incremental change in the conductance. The line 404 of FIG. 4 is a reference for which the ambient light level is equal to the back or rearward light level. For points which lie to the right of line 404, the ambient light level is higher than the rearward light level and an incremental change in the ambient light level which is required to produce a given increment of change in the conductance of ambient light sensor will be greater than the increment of change in the rearward light level required to produce the same given increment of change in the conductance of the rearward light sensor. If the sensor responses were matched at this point, the increments would be equal. The mismatch has the effect of reducing the slopes of the curves which lie farther to the right relative to the line 404. This argument is not rigorous and is intended only to indicate one of the reasons that the non-ideal performance of the photocells does affect the characteristics of the control. It should be understood that adjustments in $S_A$ and in $\alpha$ should ultimately be verified experimentally and adjusted to achieve the best overall result when the actual light levels and resulting mirror reflectance are controlled and measured simultaneously.

Note the control has nearly the same $\alpha$ for the curve 401a as for the curve 401 and yet—probably for the reasons just given—the slope of curve 401 is generally somewhat greater than the slope of curve 401a. For the curve 401a the glare threshold is lower so that the mirror is substantially more sensitive than for the curve 401. To cause the slopes to match more closely, the $\alpha$ for the curve 401a would have to be increased somewhat from that for the curve 401. This is a situation similar to that cited for the example where a very sensitive setting of the mirror was required and a higher $\alpha$ was required for satisfactory performance at the more sensitive setting. The example required a greater than unity slope of the curve as plotted in FIG. 4 for the higher sensitivity and because of the non-ideal characteristics of the photocells the $\alpha$ for more sensitive setting had to be even higher than expected. Thus, the ability to adjust the slope characteristics is used both to compensate for photocell characteristics and to achieve the desired slope of the glare threshold as a function of the ambient light level when measurements are finally taken in terms of actual light levels instead of in terms of signal levels which may be somewhat distorted by characteristics of the sensors and their associated circuit. Note that this arrangement also may be extended to compensate for simple mismatches in slope characteristics between the ambient light and the back light sensors.

| COMPONENT LISTS COMPONENTS USED IN FIG.2 | | |
|---|---|---|
| *R1 | Resistor | 5.4K ohm |
| *R2 | Resistor | 150 ohm |
| *R3 | Resistor | 4.53K ohm |
| *R4 | Resistor | 280 ohm |
| *R5 | Resistor | 1K ohm |
| *R6 | Resistor | 1.8K ohm |
| *R7 | Resistor | 1K ohm |
| *R8 | Resistor | 10K ohm |
| *R9 | Resistor | 1.8K ohm |
| *R10 | Resistor | **1K ohm |
| *R11 | Resistor | **7350 ohm |
| *R12 | Resistor | 15K ohm |
| *R13 | Resistor | 1K ohm |
| *R15 | Resistor | 47K ohm |
| *R16 | Resistor | 18.1K ohm |
| *R17 | Resistor | 10K ohm |
| *R18 | Resistor | 22K ohm |
| *R19 | Resistor | 1K ohm |
| *R20 | Resistor | 3.3K ohm |
| *R21 | Resistor | 10K ohm |
| *R22 | Resistor | 10K ohm |
| *R23 | Resistor | 4.7K ohm |
| R31 | Resistor | 270 ohm 1 W |
| R32 | Resistor | 47K ohm |
| R33 | Resistor | 10K ohm |
| R34 | Resistor | 3.9 ohm 1 W |
| R35 | Resistor | 100 ohm |
| R36 | Resistor | 1.2 ohm .5 W |
| R37 | Resistor | 2.7K ohm |
| R38 | Resistor | 47 ohm |
| R40 | Resistor | 11K ohm |
| R41 | Resistor | 330K ohm |
| R42 | Resistor | 5.6K ohm |
| R43 | Resistor | Cadmium Sulfide Photoconductive Cell |
| R44 | Resistor | 47 ohm |
| R45 | Resistor | Cadmium Sulfide Photoconductive Cell |
| R46 | Resistor | 47K ohm |
| R47 | Resistor | 100K ohm Potentiometer |
| R48 | Resistor | 470K ohm |
| *R50 | Resistor | 6.2K ohm |
| R51 | Resistor | 1100 ohm |
| *R52 | Resistor | 22K ohm |
| *R53 | Resistor | 30K ohm |
| C1 | Capacitor | 47 mfd. 10 VDC |
| C2 | Capacitor | 0.1 mfd |
| C3 | Capacitor | 0.1 mfd |
| C4 | Capacitor | 100 mfd 63 VDC |
| C5 | Capacitor | 10 mfd 16 VDC |
| C7 | Capacitor | 47 mfd 10 VDC |
| D11 | Diode | Zener 6.2 VDC 1W |
| D20 | Diode | 1N4004 |
| *Q1 | Transistor | 2N3904 |
| *Q2 | Transistor | 2N3904 |
| *Q3 | Transistor | 2N3904 |

-continued

COMPONENT LISTS
COMPONENTS USED IN FIG.2

| | | |
|---|---|---|
| *Q4 | Transistor | 2N3904 |
| *Q5 | Transistor | 2N3904 |
| *Q6 | Transistor | 1/5 CA3083 |
| *Q7 | Transistor | 1/5 CA3083 |
| *Q8 | Transistor | 1/5 CA3083 |
| *Q8A | Transistor | 1/5 CA3083 |
| *Q9 | Transistor | 1/5 CA3083 |
| *Q10 | Transistor | 2N3906 |
| *Q11 | Transistor | 2N3904 |
| *Q12 | Transistor | 2N3904 |
| *Q13 | Transistor | 2N3904 |
| Q20 | Transistor | TIP122 |
| Q21 | Transistor | 2N3904 |
| Q22 | Transistor | MPS2222A |
| *Q30 | Transistor | 1/5 CA3083 |
| *Q31 | Transistor | 1/5 CA3083 |
| *U1/A | Op Amp | 1/4 LM2902 |
| *U1/B | Op Amp | 1/4 LM2902 |
| *U1/C | Op Amp | 1/4 LM2902 |
| *U1/D | Op Amp | 1/4 LM2902 |
| *U2/A | Op Amp | 1/4 LM2901 |
| *U2/B | Op Amp | 1/4 LM2901 |

*Functional equivalents of these components may be included in an integrated circuit.
**The values of these components are for an α of approximately 1.3 and may be adjusted to obtain other values for α.

COMPONENTS USED IN FIG. 2A1

| | | |
|---|---|---|
| *R1 | Resistor | 5.4K ohm |
| *R2 | Resistor | 150 ohm |
| *R3 | Resistor | 4.53K ohm |
| *R4 | Resistor | 280 ohm |
| *R10 | Resistor | 1K ohm |
| *R11 | Resistor | 7350 ohm |
| *R12 | Resistor | 15K ohm |
| *R13 | Resistor | 1K ohm |
| *R15 | Resistor | 47K ohm |
| *R16A | Resistor | 470K ohm |
| *R17A | Resistor | 270K ohm |
| *R18 | Resistor | 22K ohm |
| *R19 | Resistor | 1K ohm |
| *R20 | Resistor | 3.3K ohm |
| *R21 | Resistor | 10K ohm |
| *R22 | Resistor | 10K ohm |
| *R23 | Resistor | 4.7K ohm |
| R31 | Resistor | 270 ohm 1 W |
| R32 | Resistor | 47K ohm |
| R33 | Resistor | 10K ohm |
| R34 | Resistor | 3.9 ohm 1 W |
| R35 | Resistor | 100 ohm |
| R36 | Resistor | 1.2 ohm .5 W |
| R37 | Resistor | 2.7K ohm |
| R38 | Resistor | 47 ohm |
| R40 | Resistor | 11K ohm |
| *R41A | Resistor | 680K ohm |
| *R41B | Resistor | 180K ohm |
| R44A | Resistor | 1.2K ohm |
| R46 | Resistor | 47K ohm |
| R47 | Resistor | 100K ohm Potentiometer |
| *R50 | Resistor | 6.2K ohm |
| R51 | Resistor | 1100 ohm |
| *R52 | Resistor | 22K ohm |
| *R53 | Resistor | 30K ohm |
| R54 | Resistor | 12 ohm |
| R55 | Resistor | 11 ohm |
| R56 | Resistor | 120 ohm |
| R57 | Resistor | 180 ohm |
| R58 | Resistor | 180 ohm |
| R60 | Resistor | 2.7K ohm |
| R61 | Resistor | 150K ohm |
| R62 | Resistor | 470K ohm |
| R70 | Resistor | 4.7K ohm |
| C1 | Capacitor | 47 mfd. 10 VDC |
| C2 | Capacitor | 0.1 mfd |
| C3 | Capacitor | 0.1 mfd |
| C4 | Capacitor | 100 mfd 63 VDC |
| C5 | Capacitor | 10 mfd 16 VDC |

-continued

COMPONENTS USED IN FIG. 2A1

| | | |
|---|---|---|
| C7A | Capacitor | Non-polarized 47 mfd 10 VDC |
| D11 | Diode | Zener 6.2 VDC 1W |
| D20 | Diode | 1N4004 |
| **D45 | Photodiode | S1337-66BR (Hamamatsu) |
| *Q1 | Transistor | 2N3904 |
| *Q2 | Transistor | 2N3904 |
| *Q3 | Transistor | 2N3904 |
| *Q4 | Transistor | 2N3904 |
| *Q5 | Transistor | 2N3904 |
| *Q8 | Transistor | 1/5 CA3083 |
| *Q9A | 4 Transistors | 4 parallel transistors CA3083 |
| *Q10 | Transistor | 2N3906 |
| *Q11 | Transistor | 2N3904 |
| *Q12 | Transistor | 2N3904 |
| *Q13 | Transistor | 2N3904 |
| Q20 | Transistor | TIP122 |
| Q21 | Transistor | 2N3904 |
| Q22 | Transistor | 2N2222 |
| Q23 | Transistor | 2N2222 |
| Q24 | Transistor | 2N2222 |
| Q25 | Transistor | 2N2222 |
| *Q30 | Transistor | 1/5 CA3083 |
| *Q31 | Transistor | 1/5 CA3083 |
| *U6/A | Comparator | 1/4 TLC354CN (Texas Instruments) |
| *U6/B | Comparator | 1/4 TLC354CN (Texas Instruments) |
| *U3/A | Op Amp | 1/4 TLC27L4ACN (Texas Instruments) |
| *U3/B | Op Amp | 1/4 TLC27L4ACN (Texas Instruments) |
| *U3/C | Op Amp | 1/4 TLC27L4ACN (Texas Instruments) |
| *U3/D | Op Amp | 1/4 TLC27L4ACN (Texas Instruments) |

*Components or functional equivalents which may be included in an integrated circuit.
**These components should be packaged in hybrid form with the integrated circuit; other components may be.

COMPONENTS USED IN FIG. 2A2

| | | |
|---|---|---|
| *R5 | Resistor | 1K ohm |
| *R6 | Resistor | 1.8K ohm |
| *R7 | Resistor | 1K ohm |
| *R8 | Resistor | 10K ohm |
| *R9 | Resistor | 1.8K ohm |
| **R42A | Resistor | 120K ohm |
| **R48A | Resistor | 150 Meg ohm |
| **D43 | Photodiode | S1337-66BR (Hamamatsu) |
| *Q6A | 4 Transistors | 4 parallel transistors CA3083 |
| *Q7 | Transistor | 1/5 CA3083 |
| *U5/B | Op Amp | 1/4 TLC27L4ACN (Texas Instruments) |

*Components or functional equivalents which may be included in an integrated circuit.
**These components should be packaged in hybrid form with the integrated circuit; other components may be.

PHOTODIODE BASED MIRROR CONTROL CIRCUIT

Figure 5A:
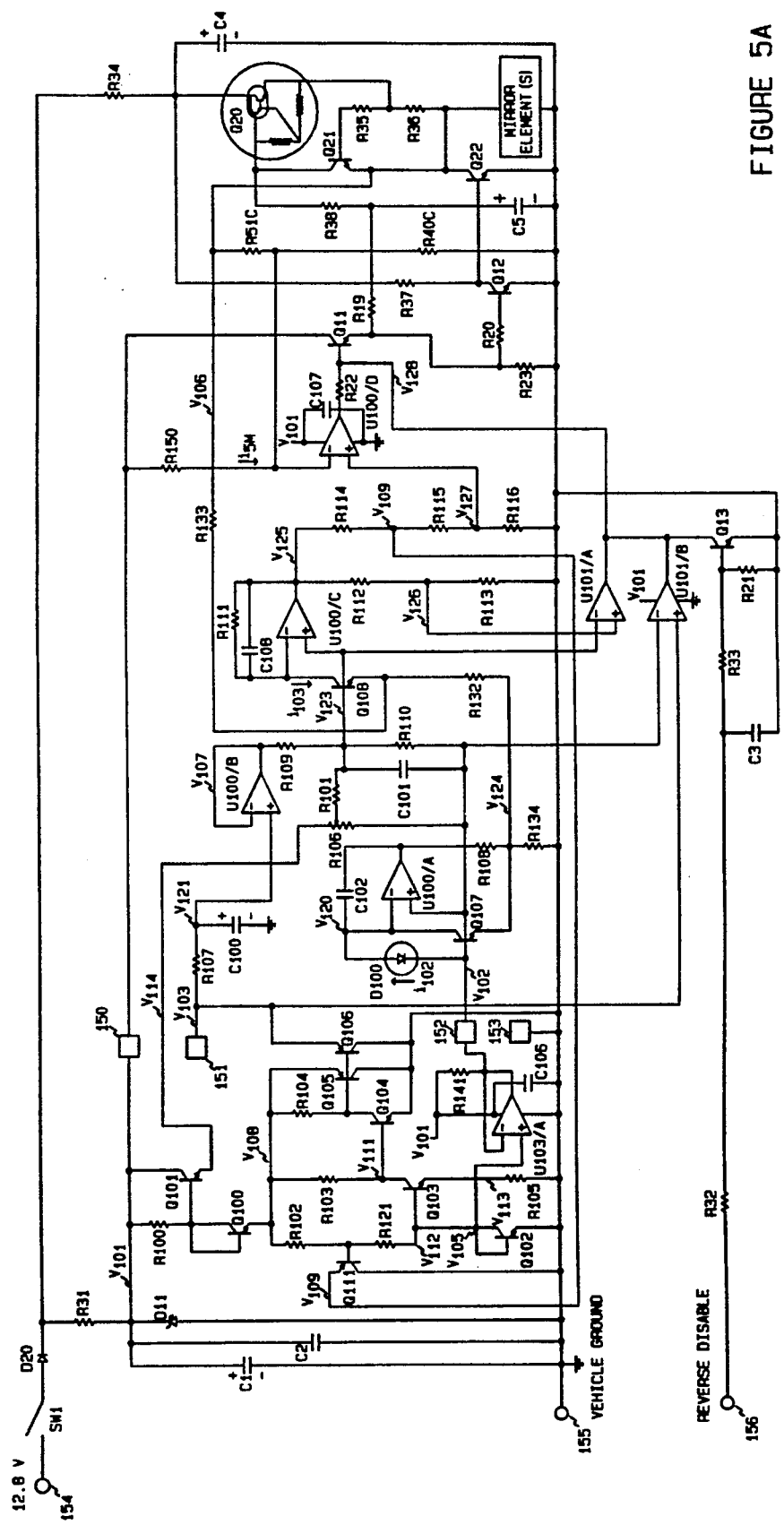
FIGS. 5A and 5B are schematic circuit diagrams of an embodiment of the invention which is designed especially for the effective use of photodiodes.
Figure 5B:
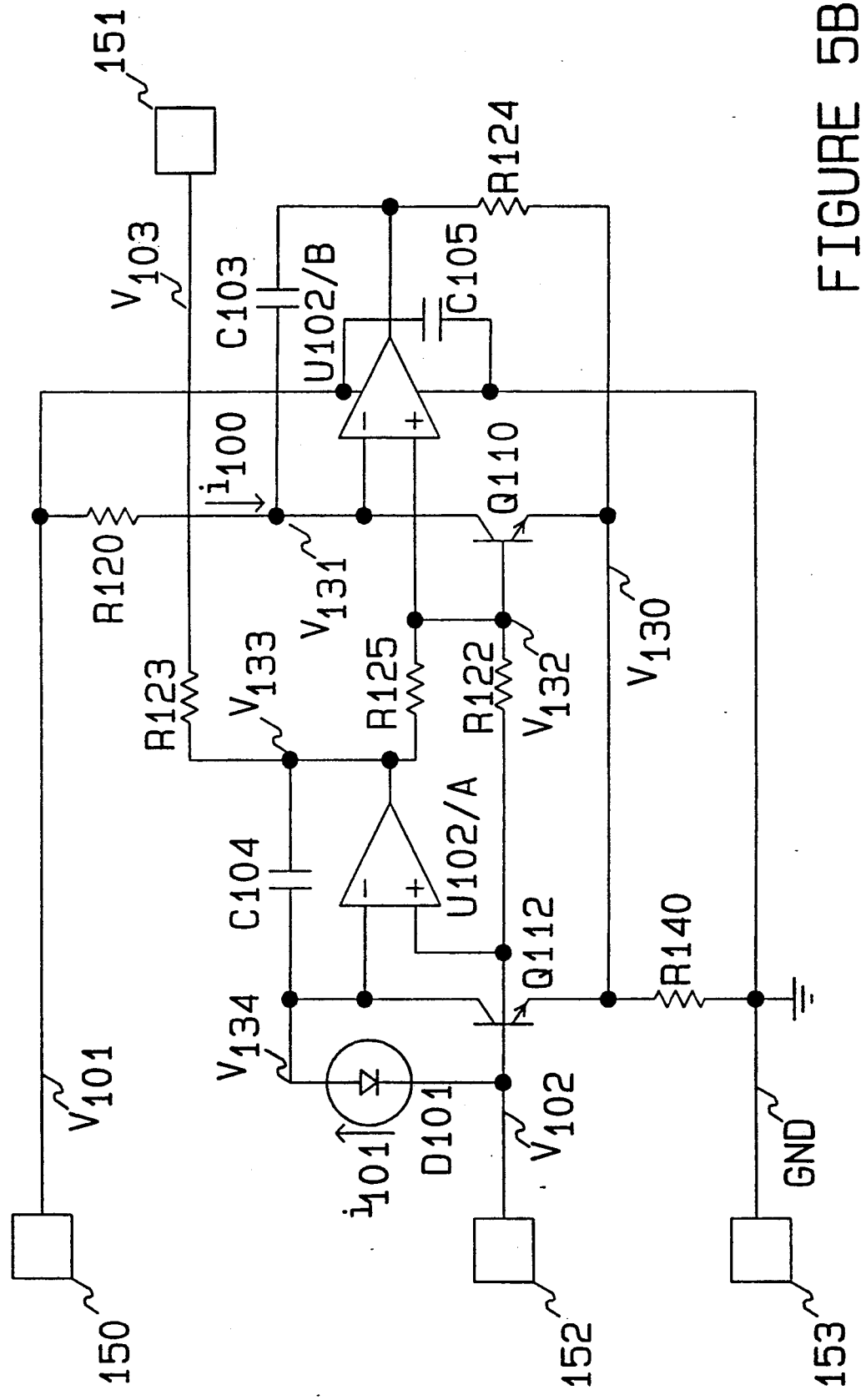

The extremely low currents from the photodiodes when used as the light sensors for the mirror control present special circuit problems. The photodiodes D43 and D45 of FIGS. 2A2 and 2A1 do function properly at temperatures which are not elevated and do serve to demonstrate the flexibility of the circuit design and the control techniques to utilize either photoresistors or photodiodes. The circuit of FIGS. 5A and 5B is also based on the block diagram of FIG. 1 and is configured to handle the small signal levels of the photodiodes in a more practical way. The specialized features include the following: The light sensing photodiodes D100 and D101 are configured to operate with nearly zero volts across them. This minimizes the leakage currents and the resulting errors which they cause. This feature is especially valuable for operation at elevated temperatures because the leakage currents of the photodiodes increase dramatically at higher temperatures. The transistors Q107, Q108, Q110 and Q112 which perform the logarithmic and the antilogarithmic conversions are used in the higher quality base to emitter voltage versus collector current mode. The base to emitter voltage versus emitter current mode used in the circuits of FIGS. 2, 2A1 and 2A2 are most likely to cause difficulty at very low current. At low current, the current gain of the transistors may be much lower than at higher currents and the errors due to this loss of gain increase much more rapidly when using the emitter current mode. Instead of using a resistor in parallel with the front sensor D101 to limit response to very low ambient light levels, the output of the forward sensing circuit of FIG. 5B is clamped by a temperature compensated circuit so that it does not assume levels which would cause the mirror to become overly sensitive when the ambient light level is very low. The temperature compensated voltage reference used to establish this clamp is also used to supply the setpoint adjustment. This makes it practical to use the setpoint adjustment over a larger adjustment range without incurring undesirably large changes in the setpoint calibration with changes in temperature. The clamp is superior to the resistor in parallel with the front sensor since the parallel resistor would have an unreasonably high resistance value if incorporated in this circuit. The compensated setpoint supply relaxes constraints on the way in which the setpoint circuit is configured. Optimization of the circuit to function with low sensor currents makes it possible to use more economical, smaller area sensors and to extend the upper temperature limit at which satisfactory calibration and performance are maintained.

Refer to FIGS. 5A and 5B. As with FIGS. 2A1 and 2A2, the circuit has been divided into two portions so that the low level signal processing functions associated with the ambient light sensor are performed in the associated circuit of FIG. 5B and the low level signal processing functions associated with the glare sensor are performed in the associated circuit of FIG. 5A. Components with sequence numbers that are below 100 are used in ways which are similar to to their use in FIG. 2 so description of their function will not be repeated.

Refer to FIG. 5A. The 12.8 volt vehicle supply is connected to terminal 154 and ground is connected to terminal 155. The backup lights are connected to terminal 156. The circuit shown in FIG. 5A incldues but is not limited to the portion which processes the low level signals from the glare sensor.

Q100 through Q106 and the associated circuit provide the clamping action for the ambient light signal as specified in block 37 of FIG. 1. The limiting action is applied to the signal from block 10 as indicated by the dotted line and not directly to the sensor as is done by use of the parallel resistor. The parallel resistor option is indicated by the solid line between blocks 5 and 37. The voltage $V_{105}$ on diode connected transistor Q102 is buffered by operational amplifier U103/A so that $V_{102}$ is nearly equal to $V_{105}$ and serves as the level to which signals are referenced in the computational portion of the circuit. The logarithmically related values are proportional to absolute temperature so to clamp the ambient light signal to a level which represents a constant logarithmic value, the clamping voltage must have the same temperature dependence. The circuit used to generate the reference voltage for the clamp is not the same as but has similarities to one used in 1.2 volt band gap regulators. The resistance of R103 is nominally ten times the series resistance of R102 and R121 and Q104 in combination with emitter follower transistor Q105 conduct to clamp the voltage $V_{108}$ so as to regulate the voltage $V_{111}$ so that it just turns on Q104. Thus, $V_{111}$ is nearly equal to $V_{112}$ which makes the voltage across R103 nearly equal to the voltage across the series resistors R102 and R121. Because the resistance ratio is ten, the current through Q102 is approximately ten times the current through Q103. Because of the temperature dependent logarithmic relationship between the emitter currents and the base to emitter voltages, the difference in base to emitter voltages between Q102 and Q103 is proportional to the absolute temperature times the logarithm of the current ratio of approximately 10. This voltage difference is approximately 60 millivolts at 25 Celsius and appears across the resistor R105. The transistors are relatively high gain so for this discussion, the base currents will be neglected. Thus, approximately the same current flows through both R103 and R105 making the ratio of the voltages across these resistors approximately equal to the ratio of their resistance values which has been nominally chosen as 50. Thus, the voltage across R103 is approximately 3 volts at 25 Celsius and varies in approximate proportion to the absolute temperature as required. The base to emitter voltages of Q105 and Q106 approximately cancel each other and the ambient light signal $V_{103}$ is clamped by Q106 so that it does not exceed a voltage level approximately equal to $V_{108}$. Current is supplied to the circuit through resistor R100 and diode connected transistor Q100. The voltage drop across Q100 is approximately equal to the base to emitter voltage of Q101 so that the voltage $V_{114}$ supplied to the setpoint potentiometer R106 is approximately equal to $V_{108}$. The value of R121 is chosen so that when Q111 is conducting and performing its clamping function, $V_{109}$ which is equal to the sum of the emitter to base voltage of Q111, the voltage drop across R121 and the base to emitter voltage of Q102 is approximately equal to 2.4 volts. At 2.4 volts the positive temperature coefficient of the voltage drop across R121 approximately cancels the negative temperature coefficient of the sum of the base to emitter voltage of Q102 with the emitter to base voltage of Q111. Thus, Q111 clamps $V_{109}$ to a voltage which does not change appreciably with temperature. The clamping action corresponds to block 14 of FIG. 1 and serves to limit and control the maximum voltage which is supplied to the mirror element. R104 establishes the operating current of Q104 at just under 100 microamps. C106 and C107 are power supply bypass capacitors for the associated quad operational amplifiers U103 and U100. C102 and C108 are feedback capacitors used to provide stable closed loop operation for operational amplifiers U100/A and U100/C.

R141 is used to bias the output of operational amplifier 103/A to operate in the current sinking mode and prevent unstable operation which resulted from frequent changes between the current sourcing and the current sinking modes of operation. Frequency stabilization of the circuit of FIGS. 5A and 5B is difficult and anyone attempting to duplicate the circuit should pay close attention to the possibility of having to deal with oscillation problems which may arise due to component selection, circuit layout, or operating conditions. Relatively routine measures should suffice to correct these problems if they arise.

With respect to the circuit of FIG. 5B which is closely associated with the ambient light sensor, the circuit is powered by the 6.2 volt supply at terminal 150 and ground at terminal 153. The voltage $V_{102}$ to which the voltages in the computational portion of the circuit are referenced is supplied at terminal 152 and the signal which is logarithmically related to the ambient light level is output on terminal 151.

The voltage $V_{102}$ is somewhat higher than the base to emitter voltage of Q112 and the output of operational amplifier U102/B operates through the voltage divider formed by resistors R124 and R140 to establish the voltage $V_{130}$ which is required to hold $V_{131}$ approximately equal to $V_{132}$. R120 supplies the current $i_{100}$ which corresponds to iDAY in FIG. 1. Optionally R120 may be replaced by a current source. The base to emitter voltage of Q110 corresponds to the logarithmically related signal from block 2 of FIG. 1.

$i_{101}$ varies in approximate proportion to the light level impinging upon photodiode D101 and corresponds to $i_{FRONT}$ in FIG. 1. The base to emitter voltage of Q112 corresponds to the logarithmically related signal from block 4 of FIG. 1. The output of operational amplifier U102/A operates through the voltage divider formed by resistors R125 and R122 and through Q110 and U102/B to change the voltage $V_{130}$ and then through Q112 to change the voltage $V_{134}$ in such a way as to hold $V_{134}$ approximately equal to $V_{102}$. This establishes the voltage of approximately zero volts across photodiode D101 as desired to minimize undersirable leakage currents. Capacitors C103 and C104 compensate the operational amplifier control loops to prevent oscillation. The difference between voltage $V_{132}$ and voltage $V_{102}$ corresponds to the signal from block 8 of FIG. 1 and is zero when the ambient light is at the day threshold. This voltage increases to the clamp voltage when the ambient light level is very low. The current to the base of Q110 has a negligible effect on the voltage at $V_{132}$ so that $$(V_{133} - V_{102})/(V_{132} - V_{102}) = (R125 + R122)/R122$$

which corresponds to the gain AG in block 9 of FIG. 1. Resistor R123 limits current due to the clamping action of Q106 of FIG. 5A which occurs when very low ambient light levels are represented by a high value of $V_{133}$. Refer also to FIG. 5B. Series resistors R123 and R107 and capacitor C100 perform the time averaging function which corresponds to block 10 of FIG. 1. Other time averaging circuits such as the one of FIG. 2A1 may be used or the time average may even be eliminated. The average is referenced to $V_{102}$. In the circuit, the clamp voltage $V_{108}$ corresponds to the maximum ratio of day threshold to ambient light to which the circuit will respond. Since the day threshold is chosen as a given constant level, an increase in the clamp voltage $V_{108}$ at a given temperature, represents an increase in the maximum ratio of $i_{DAY}$ to $i_{FRONT}$ and this causes the minimum forward light level to which the circuit responds to decrease. A reduction in the gain AG which is controlled by the resistor divider also has the effect of decreasing the minimum forward light level to which the circuit responds.

With respect to the computational portion of the circuit which centers around the low level signals from the glare sensing photodiode D100 and the exponential or antilogarithmic converter, voltage $V_{102}$ is the level to which the voltages in the computational circuit are referenced. $i_{102}$ varies in approximate proportion to the glare causing light which strikes glare sensing photodiode D100 and corresponds to $i_{BACK}$ of FIG. 1. $i_{102}$ flows through the collector of transistor Q107 and the base to emitter voltage of Q107 corresponds to the logarithmically related signal from block 6 of FIG. 1. The output of operational amplifier U100/A operates through the voltage divider formed by resistors R108 and R134 to control the emitter voltage of Q107 so as to hold the voltage $V_{120}$ substantially equal to $V_{102}$. Thus, the voltage across D100 is maintained at nearly zero volts. Initially assume that R132 is replaced with a short. Operational amplifier U100/B is configured as a voltage follower so that $V_{107}$ is held nearly equal to $V_{121}$. $V_{107}$ corresponds to the voltage from the averaging circuit in block 10 for FIG. 1. The series resistors R109 and R110 form a voltage divider which is the principal component which determines the fractional gain $\alpha/AG$ which corresponds to block 11 of FIG. 1. The impedance of the path through the setpoint circuit which includes R101 and R106 also affects the value of $\alpha$ and more elaborate networks can be added to adjust the sensitivity and the slope somewhat independently as was done in the circuit of FIG. 2A1. Accordingly, these steps will not be repeated in detail here. Adjustment of R106 to increase the voltage $V_{122}$ increases the voltage from the base to the emitter of transistor Q108 which performs the exponential or antilogarithmic conversion. A change which decreases the ratio of $(V_{107} - V_{102})$ to its contribution to the voltage $(V_{123} - V_{102})$ relative to the ratio of $(V_{133} - V_{102})$ to $(V_{132} - V_{102})$ decreases $\alpha$ for the circuit. Capacitor C102 stabilizes the feedback loop for stable operation and capacitor C101 filters $V_{123}$ to minimize the effects of interference which can be picked up on the setpoint and averaging circuits. The voltage $(V_{123} - V_{102})$ is created by the sum of the current through R109 from the ambient light circuit and the current through R101 from the setpoint potentiometer. The voltage $(V_{123} - V_{124})$ across the base to emitter of the antilog transistor Q108 is the sum of the voltage $(V_{133} - V_{102})$ and the base to emitter voltage of Q107 which is logarithmically related to the glare causing light level. Thus, $(V_{123} - V_{124})$ corresponds to the summation in block 12 of FIG. 1.

The collector current $i_{103}$ of antilog transistor Q108 corresponds to $i_{EXP}$ of FIG. 1. Operational amplifier U100/C maintains the collector to base voltage of Q108 at a near zero level and supplies the current $i_{103}$ through resistor R111. R112 and R113 form a divider and to dim the mirror the glare level must be high enough to cause the current $i_{103}$ to be high enough to increase the voltage across R111 and thereby increase the voltage $V_{125}$ to the point that voltage $V_{126}$ exceeds voltage $V_{123}$ so that the output of comparator 101/A can be pulled high to enable dimming of the mirror. The ambient light level must be low enough that the voltage $V_{103}$ exceeds the voltage $V_{102}$ so that the output of comparator U101/B can be pulled high to enable dimming of the mirror. The voltage from the backup lights must be low indicating that the vehicle is not in reverse so that transistor Q13 is turned off so that its collector can be pulled high to enable dimming of the mirror. When all three of the conditions are met, $V_{128}$ is not held low and voltage is supplied to dim the mirror. Series resistors R114, R115 and R116 form a voltage divider which is chosen so that $V_{127}$ spans the desired range to control the mirror element voltage. Resistor R114 serves to limit the current drawn from the output of operational amplifier U100/C when the clamping transistor Q111 limits the voltage $V_{109}$. The ratio of R115 to R116 determine the maximum value of $V_{127}$ relative to the voltage at which $V_{109}$ is clamped. The voltage $V_{127}$ across R116 corresponds generally to the voltage $V_M$ across resistor 15 in FIG. 1. Here the correspondence is not exact since the voltage from the exponential current is actually developed across R111 and then supplied by operational amplifier U100/C to R116 via the voltage divider. Also, the voltage across R116 is increased by an offset because R111 is referenced to $V_{123}$ rather than to ground. This turns out to be desirable because the effect is similar to that introduced by $i_5$ which is generated by R18, Q30, and Q31 in FIG. 2. The offset is still represented by block 16 of FIG. 1, the difference being that it is introduced earlier as indicated by the dotted line 40 in FIG. 1. If the offset is too great, it is reduced by the counter effect of $i_{5M}$ which is generated by the effect of the current $i_{5M}$ supplied through R150 from the 6.2 volt source $V_{101}$. The explanation is similar to that already given for the effect of $i_5$ in FIG. 2 except that the mirror voltage is reduced instead of being increased because the direction of $i_{5M}$ is opposite to that of $i_5$.

Now assume that R132 is not shorted. Increases in $i_{103}$ cause a small voltage drop across R132 which decreases the voltage which would otherwise be applied to the base to emitter of Q108. This has the effect of decreasing the slope of $i_{103}$ when plotted against the glare level. Current through R133 from the mirror element accentuates this effect. This corresponds to the additional shaping which is optionally performed in the exponential conversion in block 13 of FIG. 1.

| COMPONENTS USED IN FIG. 5A | | |
|---|---|---|
| *R19 | Resistor | 1K ohm |
| *R20 | Resistor | 3.3K ohm |
| *R21 | Resistor | 10K ohm |
| *R22 | Resistor | 10K ohm |
| *R23 | Resistor | 4.7K ohm |
| R31 | Resistor | 270 ohm, 1 watt |
| R32 | Resistor | 47K ohm |
| R33 | Resistor | 10K ohm |
| R34 | Resistor | 3.9 ohm, 1 watt |
| R35 | Resistor | 100 ohm |
| R36 | Resistor | 1.2 ohm, 0.5 watt |
| R37 | Resistor | 2.7K ohm |
| R38 | Resistor | 47 ohm |
| R40C | Resistor | 1K ohm |
| R51C | Resistor | 390 ohm |
| *R100 | Resistor | 2.2K ohm |
| R101 | Resistor | 150K ohm |
| *R102 | Resistor | 3.0K ohm |
| *R103 | Resistor | 50K ohm |
| *R104 | Resistor | 6.8K ohm |
| *R105 | Resistor | 1.0K ohm |
| R106 | Resistor | 1 Megohm Potentiometer |
| R107 | Resistor | 330K ohm |
| *R108 | Resistor | 22K ohm |
| *R109 | Resistor | 100K ohm |
| *R110 | Resistor | 9.0K ohm |
| *R111 | Resistor | 200K ohm |
| *R112 | Resistor | 5.0K ohm |
| *R113 | Resistor | 12.0K ohm |
| *R114 | Resistor | 5.0K ohm |
| *R115 | Resistor | 14.0K ohm |
| *R116 | Resistor | 10.0K ohm |
| *R121 | Resistor | 2.0K ohm |
| *R132 | Resistor | 1K ohm |
| *R133 | Resistor | 100K ohm |
| *R134 | Resistor | 2.2K ohm |
| R141 | Resistor | 22K ohm |
| *R150 | Resistor | 10K ohm |
| D11 | Diode | 1N4735 |
| D20 | Diode | 1N4004 |
| **D100 | Photodiode | S1133-01 (Hamamatsu) |
| *Q11 | Transistor | 2N3904 |
| *Q12 | Transistor | 2N3904 |
| *Q13 | Transistor | 2N3904 |

-continued

| COMPONENTS USED IN FIG. 5A | | |
|---|---|---|
| Q20 | Transistor | TIP122 |
| Q21 | Transistor | 2N3904 |
| Q22 | Transistor | 2N2222 |
| *Q100 | Transistor | 1/5 CA3083 |
| *Q101 | Transistor | 1/5 CA3083 |
| *Q102 | Transistor | 1/5 CA3083 |
| *Q103 | Transistor | 1/5 CA3083 |
| *Q104 | Transistor | 1/5 CA3083 |
| *Q105 | Transistor | 2N3906 |
| *Q106 | Transistor | 2N3906 |
| *Q107 | Transistor | 1/5 CA3083 |
| *Q108 | Transistor | 1/5 CA3083 |
| *Q111 | Transistor | 2N3906 |
| C1 | Capacitor | 47 mfd, 10 VDC |
| C2 | Capacitor | 0.1 mfd |
| C3 | Capacitor | 0.1 mfd |
| C4 | Capacitor | 100 mfd, 63 VDC |
| C5 | Capacitor | 10 mfd, 16 VDC |
| C100 | Capacitor | 47 mfd, 10 VDC |
| C101 | Capacitor | 0.1 mfd |
| C102 | Capacitor | 820 pf |
| C106 | Capacitor | 0.1 mfd |
| C107 | Capacitor | 0.1 mfd |
| C108 | Capacitor | 270 pf |
| *U100/A | Op amp | 1/4 TLC27L4ACN (Texas Instruments) |
| *U100/B | Op amp | 1/4 TLC27L4ACN (Texas Instruments) |
| *U100/C | Op amp | 1/4 TLC27L4ACN (Texas Instruments) |
| *U100/D | Op amp | 1/4 TLC27L4ACN (Texas Instruments) |
| *U101/A | Comparator | 1/4 TLC354CN (Texas Instruments) |
| *U101/B | Comparator | 1/4 TLC354CN (Texas Instruments) |
| *U103/A | Op amp | 1/4 TLC27L4ACN (Texas Instruments) |

*Components or functional equivalents which may be included in an integrated circuit.
**These components should be packaged in hybrid form with the integrated circuit; other components may be.

| COMPONENTS USED IN FIG. 5B | | |
|---|---|---|
| **R120 | Resistor | 3.9 Meg ohm |
| *R125 | Resistor | 100K ohm |
| *R122 | Resistor | 6.0K ohm |
| *R123 | Resistor | 10K ohm |
| *R124 | Resistor | 22K ohm |
| *R140 | Resistor | 2.2K ohm |
| *Q110 | Transistor | 1/5 CA3083 |
| *Q112 | Transistor | 1/5 CA3083 |
| **D101 | Photodiode | S1133-01 (Hamamatsu) |
| C103 | Capacitor | 470 pf |
| C104 | Capacitor | 470 pf |
| C105 | Capacitor | 0.1 mfd |
| *U102/A | Op Amp | 1/4 TLC27L4CN (Texas Instruments) |
| *U102/B | Op Amp | 1/4 TLC27L4CN (Texas Instruments) |

*Components or functional equivalents which may be included in an integrated circuit.
**These components should be packaged in hybrid form with the integrated circuit; other components may be.

It will also be understood that the values and descriptions in all of the foregoing tables may be varied depending upon the particular application of the principles of the present invention.

While preferred embodiments of the invention have been illustrated and described, it will be understood that various changes and modifications may be made without departing from the spirit of the invention.

What is claimed is:

1. An electronic control system for controlling a reflective state of an automatic rearview mirror for an automotive vehicle, said system including a rearview mirror comprising an electrochromic variable reflectance mirror element the reflectivity of which varies over a reflectance range as a function of electrical signal levels applied thereto, first sensing means effective to sense the ambient light level and produce a first electrical signal which is at least in part logarithmically related to the sensed ambient light level, second sensing means effective to sense glare causing light level and produce a second electrical signal which is at least in part logarithmically related to the sensed glare causing light level, means to combine signals derived from said first and second electrical signals to produce at least a third electrical signal which is at least in part indicative of the severity of the glare, and means responding at least in part to said third electrical signal to control the reflective state of said mirror element.

2. A system as set forth in claim 1 wherein said third electrical signal is at least in part logarithmically related to the severity of the glare.

3. A system as set forth in claim 2 including means for converting said third electrical signal by a conversion which is approximately exponential and which yields a signal having an approximate linear relation to the sensed glare level.

4. A system as set forth in claim 3 wherein said third electrical signal is clamped so as not to exceed a level which at least in part determines the maximum drive level to said mirror element.

5. A system as set forth in claim 3 including means effective to apply a voltage offset to the exponentially derived signal to improve characterization of the light reflected to the driver versus glare level.

6. A system as set forth in claim 1 including a first and a second group of mirror elements, at least one mirror element in each group having a first voltage drop in series with the first group of mirror elements and a second voltage drop in series with the second group of mirror elements, said first and second series combinations being energized by a common source whereby the control voltages applied to the first and second groups of mirror elements differ by the amount of the difference between the first voltage drop and the second voltage drop, the mirror group receiving the greater voltage being in series with the lesser voltage drop.

7. A system as set forth in claim 6 including means providing a feedback signal derived from the voltage across one of said mirror groups.

8. A system as set forth in claim 1 including means introducing a limiting action on a signal derived from said third electrical signal, the limiting action serving to control the maximum voltage which is applied to said mirror element.

9. A system as set forth in claim 8 including a feedback network effective to modify the maximum voltage which is applied to said mirror element.

10. A system as set forth in claim 1 in which a signal derived from said first electrical signal is scaled relative to a signal derived from said second electrical signal so as to at least in part characterize said third electrical signal.

11. A system as set forth in claim 10 in which the slope of glare causing light versus the ambient light required to hold the level of said third electrical signal approximately constant as the ambient light level is slowly changed is altered uniformly over a wide range of ambient and glare causing light levels by a change of said relative scaling.

12. A system as set forth in claim 10 including means for modifying both the sensitivity and the overall slope characteristics of the threshold to glare from the rear versus the ambient light reference level from the front for a predetermined mirror reflectance.

13. A system as set forth in claim 12 wherein the modification to change both sensitivity and slope characteristics may be effected during production.

14. A system as set forth in claim 12 wherein the sensitivity and slope characteristics may be approximately established in predetermined combinations for various user selectable settings.

15. A system as set forth in claim 12 including means providing relatively independent control of the sensitivity and the slope characteristics.

16. A system as set forth in claim 1 including a bipolar transistor and in which the logarithmic relationship between the emitter current and the base to emitter voltage of said bipolar transistor is used to attain at least one of said logarithmically related signals.

17. A system as set forth in claim 16 in which a sensor means draws current directly from the emitter of said transistor used to effect the logarithmic conversion.

18. A system as set forth in claim 17 including an amplifier which buffers said transistor used to effect the logarithmic conversion from the loading effects of associated circuit elements and wherein the circuit is configured so as to avoid introducing the greater than unity voltage gain of the transistor used to effect the logarithmic conversion into the feedback loop of the buffering amplifier.

19. A system as set forth in claim 1 including a bipolar transistor, the logarithmic relationship between the collector current and the base to emitter voltage of said bipolar transistor being used to attain at least one of said logarithmically related signals.

20. A system as set forth in claim 19 wherein the sensor current is introduced directly into the collector of said transistor to effect the logarithmic conversion.

21. A system as set forth in claim 1 including a circuit comprising bipolar transistor means operable to effect the logarithmic conversions, the logarithmic characteristics of said bipolar transistor means being effective to generate a fourth electrical signal, said fourth electrical signal having a temperature characteristic similar to the temperature characteristic of the logarithmic components of the logarithmically related signals, said fourth electrical signal being effective to introduce a signal whereby the adverse effects of variation in temperature are reduced.

22. A system as set forth in claim 21 wherein said fourth electrical signal is effective to clamp the signal which is logarithmically related to the ambient light level so as to prevent significant response of said mirror element to variations in ambient light levels which are below a predetermined threshold.

23. A system as set forth in claim 21 wherein said fourth electrical signal is effective as a reference to produce a setpoint adjustment whereby the adverse effects of variations in temperature are reduced.

24. A system as set forth in claim 21 wherein a portion of the circuit used to generate said fourth electrical signal is also used as a portion of the circuit which generates a fifth electrical signal, said fifth electrical signal being characterized in that the temperature characteristic of said fourth electrical signal is balanced against generally cancelling temperature characteristic of the fifth electrical signal.

25. A system as set forth in claim 24 wherein said fifth electrical signal is effective to limit the maximum voltage supplied to said mirror element.

26. A system as set forth in claim 24 including means for generating a sixth electrical signal, said sixth electrical signal being logarithmically related to a predetermined reference level and being subtracted from said first electrical signal to eliminate a temperature dependent offset in ensuing signal processing.

27. A system as set forth in claim 26 in which the magnitude of said sixth electrical signal is predetermined so as to further serve as a reference for the maximum ambient light level for which dimming of said mirror element is permitted.

28. A system as set forth in claim 1 including a network comprising a capacitor and a resistor effective to time average a signal derived from the ambient light signal with its logarithmically related component to produce a time average which has a logarithmically weighted component.

29. A system as set forth in claim 28 wherein the time average with the logarithmically weighted component responds more rapidly to increases in the average ambient light level than to corresponding decreases.

30. A system as set forth in claim 28 including means effective to amplify the signal related to the ambient light level before averaging.

31. A system as set forth in claim 1 including means preventing dimming of said element when the ambient light level exceeds a predetermined threshold value.

32. A system as set forth in claim 1 including means preventing dimming of said element when the vehicle is in reverse gear.

33. An automatic rearview mirror for automotive vehicles, said mirror including an electrochromic reflective element the reflectivity of which varies as a function of electrical signal levels applied thereto, a first photodiode sensing means effective to sense the ambient light level and generate a first electrical signal indicative of the ambient light level, a second photodiode sensing means effective to sense glare causing light level and generate a second electrical signal indicative of the glare causing light level, first circuit means associated with said first sensing means and including low level signal processing means for said first electrical signal, second circuit means associated with said second sensing means and including low level signal processing means for said second electrical signal, means interconnecting said first and second circuit means, and means at least partially included in the circuit formed from the combined first and second circuit means and effective to create a third electrical signal which is at least partially dependent on said first and second electrical signals and which is effective at least in part to determine the reflectance of said reflective element.

34. A mirror as set forth in claim 33 wherein said first circuit means is operable to create a fourth electrical signal which is logarithmically related to said first electrical signal.

35. A mirror as set forth in claim 34 wherein said second circuit means is operable to create a fifth electrical signal which is logarithmically related to said second electrical signal.

36. A mirror as set forth in claim 35 wherein said first circuit means includes an output and said second circuit means includes an input, the output from said first circuit means being averaged to create a sixth electrical signal which is input to said second circuit means.

37. A mirror as set forth in claim 35 including bipolar transistor means effective to perform logarithmic conversions, said first and second electrical signals being in the form of currents which are introduced directly into the collectors of said bipolar transistor means which perform the respective logarithmic conversions.

38. A mirror as set forth in claim 35 wherein the logarithmic characteristics of the signals which are logarithmically related to said first and second electrical signals are utilized to shape the characterization of the relative effect of the ambient reference level and the glare causing light level in the functional relationship used to determine the response of the mirror to various combinations of ambient and glare causing light levels.

39. A mirror as set forth in claim 33 including a circuit comprising bipolar transistor means effective to perform logarithmic conversions, said bipolar transistor means being operable to generate a seventh electrical signal, said seventh electrical signal having a temperature characteristic similar to the temperature characteristic of the logarithmically related components of the signals produced by the logarithmic conversions, said seventh electrical signal being used as a reference to introduce a signal processing step in which the adverse effects of variation in temperature are reduced.

40. A mirror as set forth in claim 39 including means for generating a signal which is logarithmically related to the ambient light level and wherein said seventh electrical signal is used to clamp said signal which is logarithmically related to the ambient light level so as to prevent significant response of said mirror to the variation in ambient light levels which are below a predetermined threshold.

41. A mirror as set forth in claim 39 wherein said seventh electrical signal is operable as a reference to produce a setpoint adjustment effective to reduce the adverse effects of variations in temperature.

42. A mirror as set forth in claim 39 wherein a portion of the circuit used to generate said seventh electrical signal is also used as a portion of the circuit which generates an eighth electrical signal, said eighth electrical signal being characterized in that the temperature characteristic of said seventh electrical signal is balanced against the temperature characteristic of the base to emitter voltage of said bipolar transistor means to achieve said eighth electrical signal having a modified temperature characteristic.

43. An automatic rearview mirror system for automotive vehicles, said system including first and second electrochromic reflective elements the reflectivity of each of which varies over a reflectance range as a function of electrical signal levels applied thereto, first circuit means in series with said first reflective element and effective to create a first voltage drop, second circuit means in series with said second reflective element and effective to create a second voltage drop which is not always equal in value to the first voltage drop, the first and second voltage drops differing in a manner which results in a predetermined difference in the voltage applied to said first and second mirror elements.

44. A system as set forth in claim 43 wherein multiple electrochromic elements are in series with one of the voltage drops.

45. A system as set forth in claim 43 including parallel transistor means connected to said first and second reflective elements and effective to apply a shorting action to the respective elements to speed changes in the reflectivity of said elements.

46. A system as set forth in claim 43 wherein the voltage across one of said mirror elements is operable as the source of a feedback signal effective to control the voltage on said mirror elements.

* * * * *